US008534564B2

(12) United States Patent
Hammad

(10) Patent No.: US 8,534,564 B2
(45) Date of Patent: Sep. 17, 2013

(54) INTEGRATION OF VERIFICATION TOKENS WITH MOBILE COMMUNICATION DEVICES

(76) Inventor: Ayman Hammad, Pleasanton, CA (US)

( * ) Notice: Subject to any disclaimer, the term of this patent is extended or adjusted under 35 U.S.C. 154(b) by 0 days.

(21) Appl. No.: 13/250,918

(22) Filed: Sep. 30, 2011

(65) Prior Publication Data

US 2012/0031969 A1    Feb. 9, 2012

Related U.S. Application Data

(63) Continuation-in-part of application No. 12/780,657, filed on May 14, 2010, which is a continuation-in-part of application No. 12/712,148, filed on Feb. 24, 2010, now Pat. No. 7,891,560.

(60) Provisional application No. 61/178,636, filed on May 15, 2009, provisional application No. 61/407,423, filed on Oct. 27, 2010.

(51) Int. Cl.
*G06K 19/06* (2006.01)

(52) U.S. Cl.
USPC ............ 235/492; 235/454; 235/455; 235/487

(58) Field of Classification Search
USPC .......................... 235/375, 379, 380, 454, 455
See application file for complete search history.

(56) References Cited

U.S. PATENT DOCUMENTS

| 5,336,870 A | 8/1994 | Hughes et al. |
| 5,450,537 A | 9/1995 | Hirai et al. |
| 5,625,669 A | 4/1997 | McGregor et al. |
| 5,640,577 A | 6/1997 | Scharmer |
| 5,729,591 A | 3/1998 | Bailey |
| 5,742,845 A | 4/1998 | Wagner |
| 5,794,259 A | 8/1998 | Kikinis |
| 5,974,430 A | 10/1999 | Mutschler, III et al. |

(Continued)

FOREIGN PATENT DOCUMENTS

| GB | 2459850 A | 11/2009 |
| JP | 2008-210370 A | 9/2008 |

(Continued)

OTHER PUBLICATIONS

U.S. Appl. No. 12/778,446, filed Oct. 29, 2009, Perlman, 59 pages.

(Continued)

*Primary Examiner* — Michael G Lee
*Assistant Examiner* — Tabitha Chedekel
(74) *Attorney, Agent, or Firm* — Kilpatrick Townsend Stockton LLP

(57) ABSTRACT

Apparatuses, methods, and systems pertaining to the verification of portable consumer devices are disclosed. In one implementation, a verification token is communicatively coupled to a computer by a USB connection so as to use the computer's networking facilities. The verification token reads identification information from a user's portable consumer device (e.g., credit card) and sends the information to a validation entry over a communications network using the computer's networking facilities. The validation entity applies one or more validation tests to the information that it receives from the verification token. If a selected number of tests are passed, the validation entity sends a device verification value to the verification token, and optionally to a payment processing network. The verification token may enter the device verification value into a CVV field of a web page appearing on the computer's display, or may display the value to the user using the computer's display.

40 Claims, 9 Drawing Sheets

(56) References Cited

U.S. PATENT DOCUMENTS

| | | | |
|---|---|---|---|
| 6,044,349 A | 3/2000 | Tolopka et al. |
| 6,067,621 A | 5/2000 | Yu et al. |
| 6,421,729 B1 | 7/2002 | Paltenghe et al. |
| 6,490,601 B1 | 12/2002 | Markus et al. |
| 6,499,042 B1 | 12/2002 | Markus |
| 6,571,339 B1 | 5/2003 | Danneels et al. |
| 6,850,996 B2 | 2/2005 | Wagner |
| 6,873,974 B1 | 3/2005 | Schutzer |
| 6,907,476 B2 | 6/2005 | Wagner |
| 6,983,882 B2 | 1/2006 | Cassone |
| 7,062,706 B2 | 6/2006 | Maxwell et al. |
| 7,080,048 B1 | 7/2006 | Sines et al. |
| 7,111,324 B2 | 9/2006 | Elteto et al. |
| 7,159,180 B2 | 1/2007 | Ward |
| 7,210,169 B2 | 4/2007 | Smith et al. |
| 7,216,292 B1 | 5/2007 | Snapper et al. |
| 7,231,045 B1 | 6/2007 | Parrott |
| 7,254,569 B2 | 8/2007 | Goodman et al. |
| 7,257,581 B1 | 8/2007 | Steele et al. |
| 7,275,263 B2 | 9/2007 | Bajikar et al. |
| 7,275,685 B2 | 10/2007 | Gray et al. |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,356,706 B2 | 4/2008 | Scheurich |
| 7,366,703 B2 | 4/2008 | Gray et al. |
| 7,379,919 B2 | 5/2008 | Hogan et al. |
| 7,412,420 B2 | 8/2008 | Holdsworth |
| 7,415,443 B2 | 8/2008 | Hobson et al. |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,568,631 B2 | 8/2009 | Gibbs et al. |
| 7,580,898 B2 | 8/2009 | Brown et al. |
| 7,584,153 B2 | 9/2009 | Brown et al. |
| 7,599,863 B2 | 10/2009 | Sines et al. |
| 7,627,531 B2 | 12/2009 | Breck et al. |
| 7,660,779 B2 | 2/2010 | Goodman et al. |
| 7,664,699 B1 | 2/2010 | Powell |
| 7,694,130 B1 | 4/2010 | Martinez |
| 7,716,596 B2 | 5/2010 | Cao et al. |
| 7,761,374 B2 | 7/2010 | Sahota et al. |
| 7,849,014 B2 | 12/2010 | Erikson |
| 7,891,560 B2 | 2/2011 | Hammad |
| 7,966,257 B2 | 6/2011 | DiGioacchino |
| 2001/0032182 A1 | 10/2001 | Kumar et al. |
| 2001/0042785 A1 | 11/2001 | Walker et al. |
| 2001/0054148 A1 | 12/2001 | Hoornaert et al. |
| 2002/0023054 A1 | 2/2002 | Gillespie |
| 2002/0091877 A1 | 7/2002 | Karidis |
| 2003/0115142 A1 | 6/2003 | Brickell et al. |
| 2003/0191945 A1 | 10/2003 | Keech |
| 2004/0058705 A1 | 3/2004 | Morgan et al. |
| 2004/0104268 A1 | 6/2004 | Bailey |
| 2004/0127256 A1 | 7/2004 | Goldthwaite et al. |
| 2004/0210821 A1 | 10/2004 | Kasser |
| 2004/0226999 A1 | 11/2004 | Ruat et al. |
| 2004/0248554 A1 | 12/2004 | Khan et al. |
| 2004/0254890 A1 | 12/2004 | Sancho et al. |
| 2005/0043997 A1 | 2/2005 | Sahota et al. |
| 2005/0108569 A1 | 5/2005 | Bantz et al. |
| 2005/0109838 A1 | 5/2005 | Linlor |
| 2006/0131390 A1 | 6/2006 | Kim |
| 2006/0142058 A1 | 6/2006 | Elias et al. |
| 2006/0168653 A1* | 7/2006 | Contrera ............... 726/9 |
| 2006/0253389 A1 | 11/2006 | Hagale et al. |
| 2006/0294023 A1 | 12/2006 | Lu |
| 2007/0136211 A1 | 6/2007 | Brown et al. |
| 2007/0178883 A1 | 8/2007 | Nandagopal |
| 2007/0228148 A1 | 10/2007 | Rable |
| 2007/0284443 A1* | 12/2007 | Anson et al. ............ 235/435 |
| 2008/0001744 A1* | 1/2008 | Batra et al. ............ 340/572.1 |
| 2008/0014867 A1* | 1/2008 | Finn ............... 455/41.1 |
| 2008/0040285 A1 | 2/2008 | Wankmueller |
| 2008/0110983 A1 | 5/2008 | Ashfield |
| 2008/0154770 A1 | 6/2008 | Rutherford et al. |
| 2008/0177796 A1 | 7/2008 | Eldering |
| 2008/0228653 A1 | 9/2008 | Holdsworth |
| 2008/0289022 A1 | 11/2008 | Chiu |
| 2008/0319905 A1 | 12/2008 | Carlson |
| 2009/0006646 A1 | 1/2009 | Duarte |
| 2009/0048971 A1 | 2/2009 | Hathaway et al. |
| 2009/0104888 A1 | 4/2009 | Cox |
| 2009/0132413 A1 | 5/2009 | Engelbrecht |
| 2009/0173782 A1 | 7/2009 | Muscato |
| 2009/0219430 A1 | 9/2009 | Okamoto et al. |
| 2009/0255987 A1 | 10/2009 | Olivares |
| 2009/0265260 A1 | 10/2009 | Aabye et al. |
| 2009/0289110 A1 | 11/2009 | Regen et al. |
| 2009/0307493 A1 | 12/2009 | Smith |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2010/0008535 A1 | 1/2010 | Abulafia et al. |
| 2010/0114776 A1 | 5/2010 | Weller et al. |
| 2010/0125516 A1 | 5/2010 | Wankmueller et al. |
| 2010/0176935 A1 | 7/2010 | Phillips |
| 2010/0223184 A1 | 9/2010 | Perlman |
| 2010/0257102 A1 | 10/2010 | Perlman |
| 2010/0274692 A1 | 10/2010 | Hammad |
| 2010/0274721 A1 | 10/2010 | Hammad |
| 2010/0293189 A1 | 11/2010 | Hammad |
| 2010/0293381 A1 | 11/2010 | Hammad |
| 2010/0293382 A1 | 11/2010 | Hammad |
| 2010/0318801 A1 | 12/2010 | Roberge et al. |
| 2011/0184867 A1 | 7/2011 | Varadarajan |
| 2011/0238579 A1 | 9/2011 | Coppinger |
| 2011/0246317 A1 | 10/2011 | Coppinger |
| 2011/0276418 A1 | 11/2011 | Velani |

FOREIGN PATENT DOCUMENTS

| | | |
|---|---|---|
| KR | 10-2000-0054496 A | 9/2000 |
| KR | 10-2005-0019674 A | 3/2005 |
| KR | 10-2006-0096821 A | 9/2006 |
| KR | 10-2007-0100076 A | 10/2007 |
| KR | 10-2008-0026802 A | 3/2008 |
| KR | 10-2008-0039330 A | 5/2008 |
| KR | 10-2008-0051198 A | 6/2008 |
| KR | 10-2009-0021388 A | 3/2009 |
| KR | 10-2009-0044619 A | 5/2009 |
| KR | 10-2010-0110642 A | 10/2010 |
| WO | WO 03/047208 A1 | 6/2003 |
| WO | WO 2006/099294 A1 | 9/2006 |
| WO | WO 2008/014554 A1 | 2/2008 |
| WO | WO 2009/052634 A1 | 4/2009 |

OTHER PUBLICATIONS

U.S. Appl. No. 12/778,459, filed Oct. 29, 2009, Perlman, 58 pages.
U.S. Appl. No. 12/778,485, filed Oct. 29, 2009, Perlman et al., 60 pages.
U.S. Appl. No. 12/939,963, filed Nov. 4, 2010, Hammad et al., 105 pages.
U.S. Appl. No. 61/061,936, filed Jun. 16, 2008, Manessis, 12 pages.
U.S. Appl. No. 61/112,124, filed Nov. 6, 2008, Weller et al., 61 pages.
U.S. Appl. No. 61/178,636, filed May 15, 2009, Hammad, 58 pages.
U.S. Appl. No. 61/256,095, filed Oct. 29, 2009, Perlman, 40 pages.
U.S. Appl. No. 61/256,136, filed Oct. 29, 2009, Perlman, 64 pages.
U.S. Appl. No. 61/256,141, filed Oct. 29, 2009, Perlman, 38 pages.
U.S. Appl. No. 61/256,143, filed Oct. 29, 2009, Perlman et al., 29 pages.
U.S. Appl. No. 61/256,147, filed Oct. 29, 2009, Perlman, 41 pages.
U.S. Appl. No. 61/258,194, filed Nov. 4, 2009, Hammad, 147 pages.
The International Search Report for Application No. PCT/US2010/034960, dated Dec. 22, 2010, 5 pages.

The International Written Opinion for Application No. PCT/US2010/034960, dated Dec. 22, 2010, 8 pages.

"2.4.2 How VISA Card Verification Vales are Used," 2.4.2 "z/OS V1R3.0 ICSF Application Programmer's Guide" IBM Library Server, 1 pages, © *Copyright IBM Corp.* 1997, 2002, downloaded Mar. 27, 2012 from URL: http://publibz.boulder.ibm.com/cgi-bin/bookmgr_OS390/BOOKS/CSFB4Z20/2.4.2?SHEL.

Reisinger, D., "PayPal offers SMS security key for mobile users," Nov. 24, 2008, pp. 1-3, © Copyright CBS Interactive, downloaded Mar. 27, 2012 from URL: http://news.cnet/com/8301-17939_1209-10106410-2.html.

The International Search Report of the International Searching Authority for Application No. PCT/US2010/032825, mailed on Dec. 1, 2010, 5 pages.

The Written Opinion, of the International Searching Authority for Application No. PCT/US2010/032825, mailed on Dec. 1, 2010, 6 pages.

The International Search Report of the International Searching Authority for Application No. PCT/US2010/055500, mailed on May 27, 2011, 5 pages.

The Written Opinion, of the International Searching Authority for Application No. PCT/US2010/055500, mailed on May 27, 2011, 7 pages.

The International Search Report of the International Searching Authority for Application No. PCT/US2010/048455, mailed on May 30, 2011, 6 pages.

The Written Opinion, of the International Searching Authority for Application No. PCT/US2010/048455, mailed on May 30, 2011, 5 pages.

The International Search Report of the International Searching Authority for Application No. PCT/US2011/057154, mailed on Jun. 1, 2012, 6 pages.

The Written Opinion, of the International Searching Authority for Application No. PCT/US2011/057154, mailed on Jun. 1, 2012, 4 pages.

The International Search Report of the International Searching Authority for Application No. PCT/US2011/057889, mailed on Jun. 1, 2012, 6 pages.

The Written Opinion, of the International Searching Authority for Application No. PCT/US2011/057889, mailed on Jun. 1, 2012, 4 pages.

Supplementary European Search Report mailed May 24, 2013 in European Patent Application No. 10772579.8, 6 pages.

* cited by examiner

INTEGRATION OF VERIFICATION TOKENS WITH MOBILE COMMUNICATION DEVICES

CROSS-REFERENCES TO RELATED APPLICATIONS

This application is a continuation-in-part of U.S. patent application Ser. No. 12/780,657, entitled "Verification of Portable Consumer Devices," filed May 14, 2010, which is a continuation-in-part of U.S. patent application Ser. No. 12/712,148, entitled "Verification of Portable Consumer Devices," filed Feb. 24, 2010, each of which claimed priority to U.S. Provisional Patent Application No. 61/178,636, entitled "Dynamic Data Authentication," filed May 15, 2009. This application also claims priority to U.S. Provisional Patent Application No. 61/407,423, entitled "Integration of Verification Tokens With Mobile Communication Devices," filed Oct. 27, 2010. The contents of all of the above-identified U.S. Applications are hereby incorporated in their entirety by reference for all purposes.

BACKGROUND

As methods and devices for engaging in financial transactions have increased, old problems such as fraud and counterfeiting persist.

One of the primary sources of fraud, which is prevalent in the credit card industry, is skimming. Skimming refers to the electronic copying of a card's magnetic stripe data to create counterfeit cards.

Skimming is predominantly a phenomenon afflicting static magnetic stripe based transactions. This is because the magnetic stripe, which is placed on the back of a transaction card and stores a variety of data on three separate tracks, is a passive medium. In other words, the digital content of the magnetic stripe can be perfectly copied, without any difference between the copy and the original.

One of the primary means by which skimming can be prevented is for the consumer to closely monitor the whereabouts of his transaction card. This may allow the consumer to prevent the card from being swiped through inappropriate devices. However, as contactless cards evolve, the classic skimming problem comes along with it when using static data. In fact, in a wireless environment the opportunity to skim magnetic stripe data is more prevalent. In a wireless environment, a potential skimmer need not physically possess the card to be skimmed nor have access to any of the physical equipment (e.g., POS terminal, communication lines, etc.) which is required for skimming in a wire based environment. A skimmer can, without the knowledge of the consumer or merchant, intercept the wireless transaction and copy the data being transmitted from the card to POS terminal.

To address the above problems, a dCVV or a dynamic card verification value can be used. For example, various systems and methods for generating dCVV's are discussed in U.S. patent application Ser. No. 10/642,878 entitled "Method and System for Generating a Dynamic Verification Value" filed on Aug. 18, 2003, and in U.S. patent application Ser. No. 11/764,376 entitled "On-Line Payment Transactions" filed on Jan. 29, 2008. Both of these applications are incorporated herein by reference in their entirely for all purposes.

In addition to generating a dCVV, a dCVV can be more effective for preventing fraud when it is securely received by a consumer. However, securely receiving and using a dCVV cannot overly interfere with a consumer's experience conducting a transaction. A consumer might not use the dCVV or a consumer might conduct fewer transactions if the inconvenience of receiving and using a dCVV is too great.

Embodiments of the invention are directed to addressing the above problems, and other problems, individually and collectively.

SUMMARY

Apparatuses, methods, and systems pertaining to the verification of portable consumer devices are disclosed.

One exemplary embodiment of the invention is directed to a verification token for obtaining a device verification value for a portable consumer device. The exemplary verification token comprises a peripheral interface adapted to communicatively couple to a peripheral interface of a computer, a reader adapted to read identification information from portable consumer devices, a computer-readable medium, a data processor electrically coupled to the peripheral interface of the verification token, the reader, and the computer-readable medium, and code embodied on the computer-readable medium that directs the data processor to perform various actions. In an exemplary implementation, the verification token comprises code that directs the data processor to communicate with a computer by way of the verification token's peripheral interface and to gain access to a networking facility of the computer, code that directs the data processor to receive identification information read from a portable consumer device by the reader, code that directs the data processor to transmit at least a portion of the received identification information to an entity that can provide a device verification value (e.g., validation entity or gateway) by way of the networking facility of the computer, and code that directs the data processor to receive, after transmitting said identification information, a device verification value from the entity by way of the networking facility of the computer. The verification token may send the identification information to the computer in a number of forms, including: (1) unaltered form ("clear form"), (2) encrypted form, (3) hashed formed (e.g., encoded), (4) signed form, (5) or any combination of these forms. These forms may be generated by the portable consumer device, the verification token, the computer, or any combination thereof. In addition, the verification token and the entity (e.g., validation entity or gateway) may perform a mutual authentication process before the verification token sends the identification information. As used in the claims, the term "entity that can provide a device verification value" encompasses a validation entity, a gateway, or any combination thereof.

Another exemplary embodiment of the invention is directed to a verification token for obtaining a device verification value for a portable consumer device. The exemplary verification token comprises a peripheral interface adapted to communicatively couple to a peripheral interface of a computer, a reader adapted to read identification information from portable consumer devices, a computer-readable medium, a data processor electrically coupled to the peripheral interface of the verification token, the reader, and the computer-readable medium, and code embodied on the computer-readable medium that directs the data processor to perform various actions. In an exemplary implementation, the verification token comprises code that directs the data processor to communicate with a computer by way of the verification token's peripheral interface and to access to a networking facility of the computer, code that directs the data processor to establish communications, using the networking facility of the computer, with an entity that can provide a device verification value (e.g., a validation entity, or a gateway in communication a validation entity), code that directs the data processor to receive identification information read from a portable consumer device by the reader, code that directs the data processor to transmit at least a portion of the received identification information to the entity (e.g., validation entity or gateway) by way of the networking facility of the computer, and code that directs the data processor to receive, after transmitting said identification information, a device verification value from the entity by way of the networking facility of the computer. The verification token may send the identification information to the computer in the forms indicated above.

In some implementations of these exemplary embodiments, the above codes and identification information are stored independently of the computer and are secure from programs (including spyware and other malicious programs) running on the computer. In this implementation, the identification information is put in secure form (e.g., encrypted, hashed, signed, or combination thereof) by the verification token before the information is provided to the computer. Accordingly, securing the information is not dependent upon the security of the computer. Symmetric or asymmetric keys may be used for encryption and signing. The keys for a verification token may be unique with respect to other verification tokens. Keys, and particularly symmetric keys, may be based upon a uniquely assigned serial number for the verification token, which the token communicates to the validation entity and/or gateway. Both the verification token and the validation entity and/or gateway may have a shared secret on how to derive a key from the serial number, such as by manipulating and/or replacing selected digits of the serial number. A number of keys may be derived from the unique serial number using respective shared secrets. Thus, the challenge and response messages used in a mutual authentication process may be signed using respective keys derived from the serial number.

In exemplary implementations of the above embodiments, the computer is a mobile communication device, such as a smart phone, iPhone or the like, and the token is disposed within the housing of mobile communications devices. As is known in the art, such mobile communication devices have network facilities like those of desktop and laptop computers with interconnect the device with remote data-provision entities, such website servers and data servers.

Another exemplary embodiment of the invention is directed to a mobile communication device comprising: a housing; a first processor disposed within the housing; a first memory unit disposed within the housing; an input-output controller coupled to the first processor; a verification token disposed within the housing and communicatively coupled to the input-output controller, the verification token comprising a second processor separate from the first processor, a second memory unit separate from the first memory unit, and a card reader coupled to the second processor, the card reader configured to obtain information from a portable consumer device, the verification token receiving identification information from a portable consumer device by way of the card reader, transmitting at least a portion of the received identification information to an entity that can provide a device verification value by way of the first processor, and receiving a device verification value from the entity by way of the first processor; and a battery that supplies power to the verification token.

Another exemplary embodiment is directed to a mobile communication device comprising: a housing; a first processor disposed within the housing; a first memory unit disposed within the housing; an input-output controller coupled to the first processor; a card reader configured to obtain information from a portable consumer device; a second processor disposed within the housing and communicatively coupled to the input-output controller and the card reader, the second processor being separate from the first processor and configured to process information from portable consumer devices; and a battery that supplies power to the first and second processors, the first memory unit, and the card reader.

Another exemplary embodiment of the invention is directed to a method of obtaining a device verification value for a portable consumer device. The exemplary method comprises establishing a communications link between a verification token and a computer, the computer having a networking facility; reading identification information from a portable consumer device into the verification token; transmitting the read identification information from the verification token to an entity that can provide a device verification value (e.g., a validation entity and/or gateway) through the networking facility of the computer; and after transmitting the identification information, receiving, at the verification token, a device verification value from the entity (e.g., validation entity and/or gateway) by way of the networking facility of the computer. In exemplary implementations of the above embodiments, the computer is a mobile communication device, such as a smart phone, iPhone or the like. The identification information may be transmitted from the token to the computer in a number of forms, including: (1) unaltered form ("clear form"), (2) encrypted form, (3) hashed formed (e.g., encoded), (4) signed form, (5) or any combination of these forms. These forms may be generated by the portable consumer device, the verification token, the computer, or any combination thereof. In addition, the method may include causing the verification token to authenticate the validation entity and/or gateway, such as through a mutual authentication process, before transmitting the identification information to the validation entity and/or gateway.

Another exemplary embodiment of the invention is directed to a method of obtaining a device verification value for a portable consumer device. The exemplary method comprises establishing a communications link between a verification token and a computer, the computer having a networking facility; establishing a communications session between the verification token and an entity that can provide a device verification value (e.g., a validation entity and/or gateway) using a networking facility of the computer; reading identification information from a portable consumer device into the verification token; transmitting the read identification information from the verification token to the entity (e.g., validation entity and/or gateway) through the communications session; and after transmitting the identification information, receiving, at the verification token, a device verification value from the entity (e.g., validation entity and/or gateway) by way of the communications session. The identification information may be transmitted from the token to the computer in any of the above indicated forms. In addition, the method may include causing the verification token to authenticate the validation entity and/or gateway, such as through a mutual authentication process, before transmitting the identification information to the validation entity and/or gateway.

Another exemplary embodiment of the invention is directed to a method of using a verification token. The exemplary method comprises coupling a verification token to a computer using a peripheral interface of the computer, the computer having a networking facility, the verification token comprising a peripheral interface adapted to communicatively couple to a peripheral interface of a computer, a reader adapted to read identification information from portable consumer devices, a computer-readable medium, and a data processor, the token being configured to read identification information of a portable consumer device using the reader and to obtain a device verification value therefore from a first entity (e.g., a validation entity and/or gateway) using the networking facility of the computer. The method further comprises presenting a portable consumer device to the reader of the verification token to obtain a device verification value for the portable consumer device, and providing the obtained device verification value to a second entity. The second entity may be involved with a transaction between itself and a user of the verification token.

Another exemplary embodiment of the invention is directed to a validation entity that provides device verification values to verification tokens. The exemplary validation entity comprises a computer-readable medium, a data processor electrically coupled to the computer-readable medium, and code embodied on the computer-readable medium that directs the data processor to perform various actions. The exemplary validation entity further comprises: code that directs a data processor to receive a request for a device verification value for a portable consumer device associated with a user, the request comprising identification information pertaining to the portable consumer device; code that directs the data processor to apply at least one validation test pertaining to the received request; and code that directs the data processor to send, if the at least one validation test is passed, a device verification value to a verification token associated with the user or to an entity configured to forward the device verification value to the token.

Another exemplary embodiment of the invention is directed to a computer program product that provides device verification values. The exemplary product comprises: code that directs a data processor to receive a request for a device verification value for a portable consumer device associated with a user, the request comprising identification information pertaining to the portable consumer device; code that directs the data processor to apply at least one validation test pertaining to the received request; and code that directs the data processor to send, if the at least one validation test is passed, a device verification value to a verification token associated with the user or to an entity configured to forward the device verification value to the token.

Another exemplary embodiment of the invention is directed to a validation entity that provides device verification values to verification tokens. The exemplary validation entity comprises a computer-readable medium, a data processor electrically coupled to the computer-readable medium, and code embodied on the computer-readable medium that directs the data processor to perform various actions. The exemplary validation entity further comprises code that directs the data processor to communicate with a verification token over a communications network with a computer disposed between the verification token and the communications network, the verification token being communicatively coupled to the computer by way of a peripheral interface of the computer and configured to access a networking facility of the computer, the verification token being configured to read a portable consumer device for identification information, and to cause at least a portion of the identification information to be sent in encrypted form to the validation entity using the networking facility of the computer. The exemplary validation entity further comprises code that directs the data processor to receive encrypted identification information sent by the verification token, code that directs the data processor to decrypt the encrypted identification information, code that directs the data processor the data processor to apply at least one validation test to the decrypted identification information, and code that directs the data processor to transmit, if the at least one validation test is passed, a device verification value to the verification token. Further embodiments may include transmitting the device verification value to a payment processing network.

Another exemplary embodiment of the invention is directed to a validation entity that provides device verification values to verification tokens. The exemplary validation entity comprises a computer-readable medium, a data processor electrically coupled to the computer-readable medium, and code embodied on the computer-readable medium that directs the data processor to perform various actions. The exemplary validation entity further comprises code that directs the data processor to communicate with a verification token over a communications network with a computer disposed between the verification token and the communications network, the verification token being communicatively coupled to the computer by way of a peripheral interface of the computer and configured to access a networking facility of the computer, the verification token being configured to read a portable consumer device for identification information, and to cause at least a portion of the identification information to be sent to the validation entity using the networking facility of the computer. The verification token also being configured to cause a serial number and an encrypted message to be sent to the validation entity using the networking facility of the computer. The message is encrypted by an encryption key, with the serial number and encryption key being uniquely assigned to the verification token. The exemplary validation entity further comprises code that directs the data processor to receive encrypted the serial number, the encrypted message, and identification information sent by the verification token, code that directs the data processor to apply at least one validation test to the serial number and encrypted message, and code that directs the data processor to transmit, if a selected number of the one or more validation tests are passed, a device verification value to the verification token. Further embodiments may include transmitting the device verification value to a payment processing network.

In each of the embodiments described above, and in each of the embodiments described below, the communications between the computer and the validation entity may be facilitated by, and/or conveyed through, a gateway (e.g., a proxy server, server entity, etc.) that is disposed between the computer and the validation entity. The gateway may act as an intermediary between a plurality of verification tokens and their associated computers on the one side, and a plurality of validation entities on the other side. The gateway may receive one or more initial communications from a verification token (via a computer in communication with the token), and may determine from information in the one or more initial communications an appropriate one of the validation entities to use to fulfill the token's request for a device verification value. For example, each verification token may be configured to operate with portable consumer devices issued by many different issuing banks or other such entities, and one or more of the validation entities may be configured to process requests from portable consumer devices issued by respective issuing banks or other such entities. The gateway may determine an appropriate one of validation entities to use based upon the identification information that the token read from a portable consumer device and sent to the gateway in an initial communication. In one implementation, the gateway redirects the token to the determined appropriate validation entity, with further communications occurring directly between the verification token and the appropriate validation entity. In another implementation, the communications between the verification token and the appropriate validation entity may be conveyed through the gateway (after the gateway has initially determined the identity of the appropriate validation entity based upon one or more initial communications with the token). This latter implementation may comprise relatively simple passing through of communications between the token and the appropriate validation entity with minimal processing by the gateway, or may comprise having the gateway virtually present itself as the appropriate validation entity to the verification token. Such virtual presentation may involve the gateway decrypting each message from the verification token, communicating with the appropriate validation entity to formulate a response to the token's message, and encrypting and sending a response message to the verification token. The gateway may also conduct one or more validation tests on behalf of the appropriate validation entity, particularly those related to validating the verification token. In this case, the gateway does not need to send to the appropriate validation entity those communications it receives from the token that pertain to validation tests that the gateway is handling. The gateway may be associated with, or operated by, a payment processing network.

Another exemplary embodiment of the invention is directed to a method of providing a device verification value. The exemplary method comprises: receiving, at a server, a request for a device verification value for a portable consumer device associated with a user, the request and comprising identification information pertaining to the portable consumer device; applying at least one validation test pertaining to the received request; and sending, if the at least one validation test is passed, a device verification value to a verification token associated with the user or to an entity configured to forward the device verification value to the token.

Another exemplary embodiment of the invention is directed to a method of validating a portable consumer device presented to a verification token. The exemplary method comprises communicating with a verification token over a communications network with a computer disposed between the verification token and the communications network, the verification token being communicatively coupled to the computer by way of a peripheral interface of the computer and configured to access a networking facility of the computer. The verification token is configured to read a portable consumer device for identification information, and to send the identification information in encrypted form to the validation entity using the networking facility of the computer. The method further comprises decrypting identification information received from the verification token, and applying one or more validation tests to the decrypted identification information. The method further comprises transmitting, if a selected number of the one or more validation tests are passed, a device verification value to the token. Further embodiments may include transmitting the device verification value to a payment processing network.

Another exemplary embodiment of the invention is directed to a method of validating a portable consumer device presented to a verification token. The exemplary method comprises communicating with a verification token over a communications network with a computer disposed between the verification token and the communications network, the verification token being communicatively coupled to the computer by way of a peripheral interface of the computer and configured to access a networking facility of the computer. The verification token is configured to read a portable consumer device for identification information, and to send the identification information to the validation entity using the networking facility of the computer. The verification token is also configured to send a serial number and a message encrypted by an encryption key to the validation entity, with the serial number and encryption key being uniquely assigned to the verification token. The method further comprises receiving the serial number, encrypted message, and identification information from the verification token, and applying one or more validation tests to the serial number and encrypted message. The method further comprises transmitting, if a selected number of the one or more validation tests are passed, a device verification value to the token. Further embodiments may include transmitting the device verification value to a payment processing network.

Another exemplary embodiment of the invention is directed to a method comprising reading identification information from a portable consumer device into a verification token temporarily coupled to a computer through a peripheral interface; establishing communications between a verification token and the computer, the computer having a networking facility; and establishing communications between the verification token and a validation entity using the networking facility of the computer. The verification token may be detachable coupled to the computer. The communications between the verification token and the validation entity may comprise a communications session.

To reiterate, the communications between the computer and the validation entity in each of the above embodiment may be conveyed through a server disposed between the computer and the validation entity, as described above.

Further details regarding embodiments of the invention are provided below in the Detailed Description with reference to the Figures.

DETAILED DESCRIPTION

Embodiments disclosed herein pertain to the verification of portable consumer devices. A portable consumer device comprises a device that holds identification information pertaining to an account held by a user with another entity, which is typically an entity that holds, extends, or credits items of value to the user (e.g., monetary funds, credits, debts, etc.). Portable consumer devices encompass credit cards, charge cards, debit cards, bank cards, prepaid cards, access cards, security cards, and other cards that identify an account held by a user with another entity. The cards are capable of existing in both passive forms (e.g., card with a magnetic stripe) and active forms (e.g., integrated circuit cards, smartcards), and further encompass portable electronic devices that, in whole or in part, function as such cards. Such portable electronic devices can include memory cards, account tokens, fobs, stickers, cellular telephones (including near-field communications phone), keychain devices (such as the Speedpass™ commercially available from Exxon-Mobil Corp.), personal digital assistants, other mobile electronic devices, transponders, smart media, and pagers.

Figure 7:
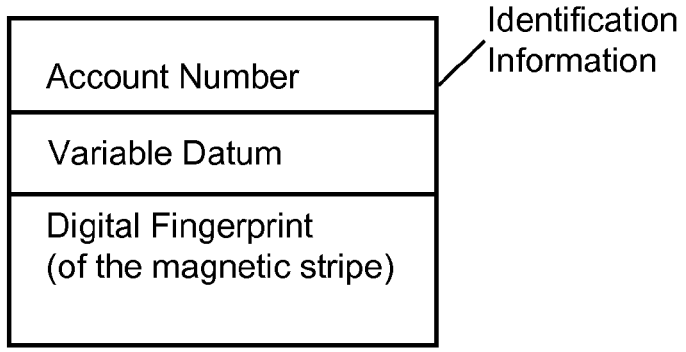
FIG. 7 illustrates an exemplary identification information that can be send by a verification token and used by a validation entity.

The identification information held by (e.g., embodied on) a consumer portable device comprises at least an account number, and preferably at least one of the following: a digital fingerprint of a magnetic stripe of the portable consumer device, or a variable datum that varies each time the portable consumer device is read for its identification information, as illustrated in FIG. 7. The magnetic stripe carries at least the account number of the device. The account number identifies the consumer account within at least one payment processing network, and may comprise a primary account number (PAN); it may also comprise alphanumeric characters. The digital fingerprint of the magnetic stripe is representative of the distribution of magnetic particles that form the magnetic stripe, and is generated by a specialized card reader that samples the distribution of magnetic particles when the card is swiped. The variable datum typically comprises number characters, but may comprise alphanumeric characters. The values of the variable datum vary in a way that is known to both the portable consumer device and an authorization entity, the latter of which may be an issuing bank or a payment processing network. The variable datum encompasses the dynamic CVV ("dCVV") and CVC3 card verification values generated by smartcards (both the contact and contactless forms), as well as cryptograms generated by many smartcards (e.g., cryptogram 17). The datum values may be pre-stored in a computer-readable medium of the device and in a computer-readable medium of the authorization entity, or may be generated by each of the device and the entity as needed (e.g., "generated on the fly") using a confidential algorithm known to the device and the entity or by a known algorithm that uses confidential keys or confidential information. The variable datum may comprise, or may be accompanied by, a counter value that indicates the number of times the portable consumer device has generated the variable datum; the counter value may assist the authorization entity in retrieving the variable datum from the entity's computer-readable medium, or in generating the variable datum from the algorithm. However, a counter value is not necessary, and the authorization entity may deduce the number of times the device has generated the variable datum from the history of authorization requests made for the device, or an algorithm that does not require a counter may be used.

The identification information may further comprise the name of the account holder (e.g., the user), the expiration date of the card, service codes, and discretionary data. As an example, the identification information may include the conventional "payment data" stored on the tracks of the magnetic stripe of a conventional credit card (e.g., Track 1, Track 2, and/or Track 3).

The identification information of a portable consumer device is read by a reader, which is an electrical component that can read the identification information from a portable consumer device and provide the identification information to another electrical component. A reader may comprise one or more of the following: a magnetic stripe reader (which may include fingerprint sampling circuitry), a card contact reader, and a contactless reader, the latter of which is commonly known as an RFID reader (RFID being an acronym for radio-frequency identification). A reader for reading fingerprints of magnetic stripes may include a security module that comprises a proprietary algorithm that generates a digital fingerprint from the sampled fingerprint data and that encrypts the digital fingerprint with a nonce word using an encryption key. Readers are predominantly found at point-of-sales locations of merchants.

A typical credit card transaction flow using a portable consumer device at a point-of-sales location is described next. The user's portable consumer device is provided to the user by or on behalf of an issuing bank. The issuing bank extends credit to the user, represents the user in credit card transactions, and pays merchants for the purchases made by the user. A user presents his or her portable consumer device to a merchant at a point-of-sales location to pay for an item or service. The merchant uses a reader to read the user's portable consumer device, and sends the identification information read from the device along with merchant's information and the transaction amount to an acquiring bank. The merchant may also read the portable consumer device for the printed card verification value (e.g., the CVV value printed on the backs of many credit cards), and may send this along as part of the transaction information sent to the acquiring bank. The acquiring bank represents, and vouches for, the merchant in credit card transactions. The acquiring bank forwards the transaction information to a payment processing network, such as VisaNet™, for authorization. A payment processing network generally encompasses a collection of one or more data processing server computers, subsystems, networks, and operations used to support and deliver one or more of the following: authorization services, exception file services, and clearing and settlement services. Payment processing networks encompass bank processing networks, credit-card payment processing network, etc. An exemplary payment processing network may include VisaNet™. Exemplary payment processing networks are able to process one or more of the following: credit-card transactions, debit-card transactions, and other types of commercial transactions. A payment processing network may use any suitable wired or wireless network, including the Internet, to communicate with acquiring banks and issuing banks.

Prior to the occurrence of a credit-card transaction, the payment processing network has established a protocol with each issuing bank on how the bank's transactions are to be authorized. In some cases, such as when the transaction amount is below a threshold value, the payment processing network will authorize the transaction based on information that it has about the user's account without consulting the issuing bank, and will accept the liability if the transaction turns out to be fraudulent. In other cases, such as when the transaction amount is above a threshold value, the payment processing network will forward the transaction information on to the issuing bank for verification and authorization. As part of the authorization process, the payment network or the issuing bank may verify the digital fingerprint or the varying datum provided by the portable consumer device. The digital fingerprint is stored at the issuing bank, and may be securely provided to the payment processing network by the issuing bank for storage and subsequent use. The algorithm for generating the varying datum is stored at the issuing bank, and may be securely provided to the payment processing network for storage and subsequent use. As also part of the authorization process, the payment network or the issuing bank may verify the printed card verification value (e.g., CVV), which is stored at the issuing bank, and may be securely provided by the issuing bank to the payment processing network for storage and subsequent use. The degree to which the payment processing network is involved in the verification of the consumer portable device and the authorization of the transaction is typically configured according to the wishes of the issuing bank. Once the transaction is authorized, the payment processing network sends an authorization indication to the acquiring bank, which sends the authorization indication on to the merchant. In order to reduce fraud, merchants are not allowed to store digital fingerprints, variable datum, and printed card verification values (CVVs) for more than 24 hours.

In the credit card industry, the authorization indication takes the form of an authorization code, which is five or six alphanumeric characters, by convention. It serves as proof to the merchant and the card holder that the issuing bank or payment processing network has authorized the transaction, and may be used by the merchant or the card holder as proof of authorization if the issuing bank later disputes the transaction, such as during settlement. The authorization code is not the same as the card verification value (or the dCVV2 value described below) since it does not have the same purpose as the card verification value, which is to serve as proof that the card was presented to the merchant when the transaction was conducted, and cannot be entered into the CVV field of a merchant POS terminal or merchant website (which only accepts 3 or 4 numeric digits).

When a user wishes to make an online purchase with a merchant over the Internet, the user types in the credit card account number, cardholder name, expiration date, and the printed card verification value into respective fields on the merchant's checkout page. In this case, the card's magnetic fingerprint or the card's variable datum is not used in the transaction, and they are not available to the payment processing network or the issuing bank to aid in verifying that the card was actually present during the transaction. Accordingly, there is a greater risk of fraud with such online purchases. For example, a store clerk can copy down the account information and printed verification value during a transaction at a point-of-sales location, and can later use the copied information to make an online purchase. As another example, a hacker can install spyware on the user's computer to intercept the account information and printed verification value, and use it to make fraudulent purchases at other online merchants. Other avenues of potential fraud exist. Embodiments of the invention are directed to mitigating these types of fraudulent activity.

Figure 1:
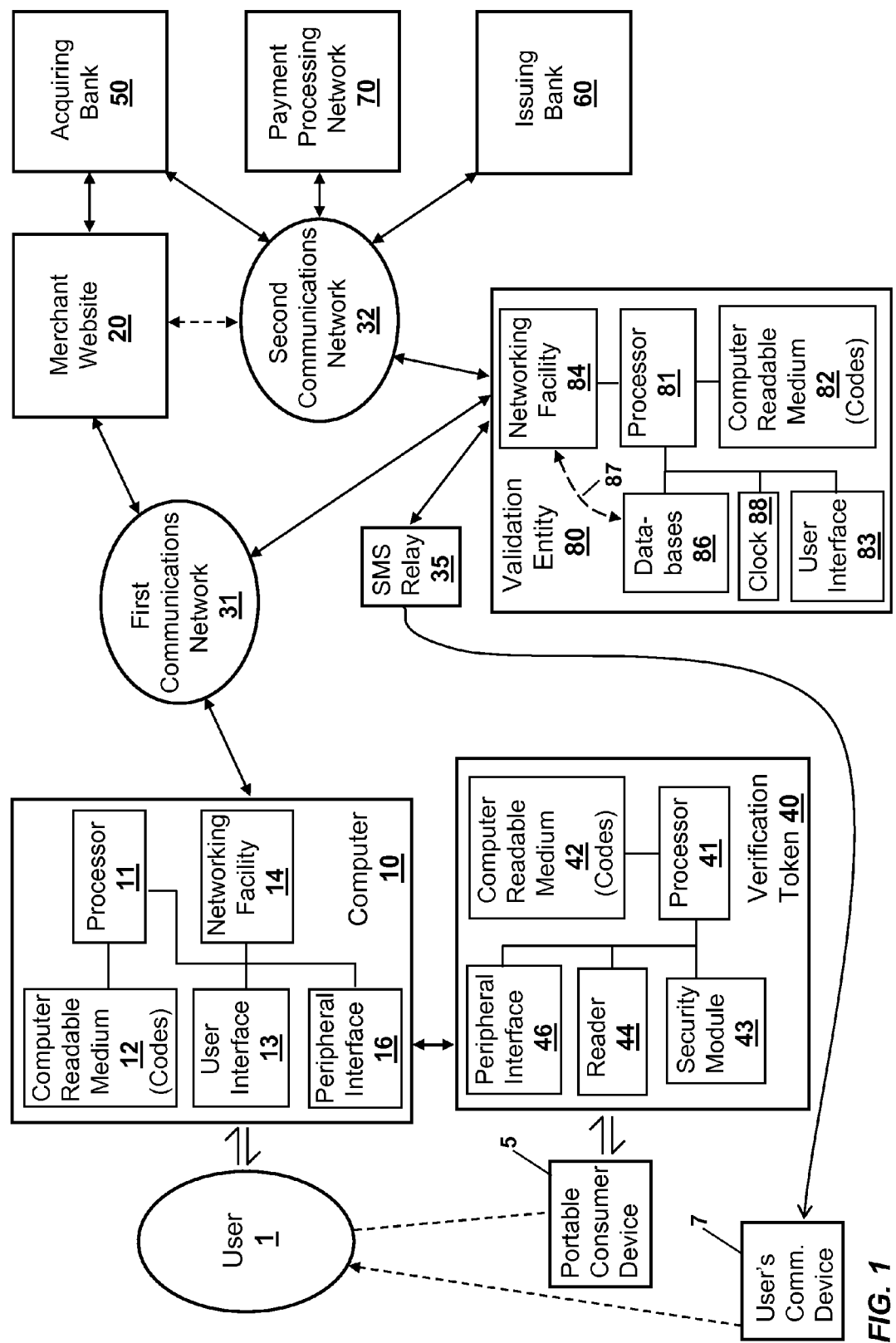
FIG. 1 illustrates some exemplary embodiments of the invention.

FIG. 1 illustrates some exemplary embodiments of the invention in the context of an online purchase. A general overview description of the embodiments and components shown in the figure will be given, followed by more detailed descriptions of the components. Shown in the figure are icons for a user 1, the user's portable consumer device 5, the user's communication device 7 (such as a cell phone), the user's computer 10, the merchant's website 20, and a first communications network 31 that enables the user's computer and the merchant's website to communicate with one another. The first communications network 31 may include the Internet, a telecommunications network (e.g., a wireless network, cell phone network, a telephone network, a cable network, or any combination thereof), a wide area network (WAN), a local area network (LAN), a home router or gateway coupled to one of the above networks, or any combination of the above. Also shown in FIG. 1 is an acquiring bank 50 for the merchant, an issuing bank 60 for the portable consumer device 5, a payment processing network 70, and a second communications network 32 that enables the payment processing network 70 to communicate with each of the banks 50 and 60. The second communications network 32 may comprise the Internet (and therefore may overlap and share facilities with the first communications network 31), or may comprise one or more private networks, or combination of one or more private networks with the Internet. A private network may comprise a telecommunications network, a wide area network (WAN), a local area network (LAN), or any combination thereof. In some instances, the first and second communications networks 31 and 32 may be the same (such as a network using the Internet as the backbone). A communications network generally comprises a network of one or more communications links and two or more nodes that pass messages from one part of the network to another part. Each node comprises one or more pieces of electrical machinery, and each link may comprise one or more of the following: optical fibers, optical links, radio links, electrical wires. The components described so far are, for the most part, conventional and arranged in a conventional manner.

FIG. 1 illustrates a verification token 40 according to one embodiment of the invention, and a validation entity 80 according to another embodiment of the invention. These components, and the interactions between them and between other components shown in FIG. 1 are novel, and do not form part of the prior art. Verification token 40 has a reader 44 to read portable consumer device 5, and a peripheral interface 46 adapted to communicatively couple to a peripheral interface 16 of computer 10. Reader 46 may comprise one or more of the following: a magnetic stripe reader (which may include fingerprint sampling circuitry and security module), a card contact reader, and a contactless reader, the latter of which is commonly known as an RFID reader. Verification token 40 is configured to communicate to validation entity 80 by way of a networking facility 14 of computer 10. After user 1 fills a purchase cart on merchant website 20, the user may bring up the merchant's checkout page to provide the user's payment information and commit to the purchase. At this point, user 1 may present his or her portable consumer device 5 to a card reader 44 of verification token 40 to provide the device's identification information (an example of which is illustrate in FIG. 7). The verification token 40 reads the identification information from the user's portable consumer device 5, and sends at least a portion of the identification information in a secure manner (e.g., in an encrypted form) to validation entity 80 to request a device verification value for the portable consumer device 5. For the sake of clarity, and without loss of generality, we can refer to the device verification value provided by validation entity 80 as a "dCVV2" value, so as to distinguish it from the dynamic "CVC3" or "dCVV" values generated by smartcards, which were described above, and from the CVV field found on the merchant's checkout page. Validation entity 80 applies one or more validation tests to verification token 40 and/or the identification information to obtain a level of confidence that the portable consumer device 5 was actually presented to verification token 40 to request the dCVV2 value. When the one or more validation tests are passed, and preferably with no tests being failed, validation entity 80 sends a dCVV2 value to verification token 40.

In cases where the user's portable consumer device 5 generates a cryptogram (e.g., cryptogram 17), card reader 44 provides the user's device 5 with "dummy" transaction information that is known to both token 40 and validation entity 80. The dummy transaction information may include a static transaction amount and a static merchant name, depending upon the type of cryptogram to be generated. The dummy transaction information may be different for each token 40. The user's device 5 uses the transaction information to generate the cryptogram. The user's device typically has a counter value, often called the Application Transaction Counter (ATC), which is included in the cryptogram computation, and which is incremented with each transaction. The counter reduces the chances of a fraudster guessing the cryptogram value. In some cases, user's device 5 may need a PIN to activate the computation of the cryptogram. For this, token 40 may display a pop-up window on the user's computer 10 that requests the entry of a PIN by the user, and token 40 may provide the pin to the user's device 5 along with the request for the cryptogram.

A first validation test that validation entity 80 may apply pertains to verifying that verification token 40 is authentic. For this, verification token 40 may send its serial number to validation entity 80, along with a message encrypted by an encryption key, with the message and encryption key being known to token 40 and entity 80 (but not the general public), and with the encryption key further being uniquely assigned to the token's serial number (uniquely assigned to the token). Validation entity 80 has a database of serial numbers and corresponding uniquely assigned encryption keys, and can validate that verification token 40 has sent the correct message for the serial number. Validation of the correct message serves to authenticate verification token 40. If the first validation test is failed, validation entity 80 may record the serial number of the failed token 40 and the source IP address from which the failed token 40 made the request in a database (such as a database 86 described below). A second validation test that validation entity 80 may apply pertains to verifying that verification token 40 has not been involved in fraudulent transactions. For this, validation entity 80 may also have a database that tracks the serial numbers of verification tokens that have been used in fraudulent activities, and may check the serial number of verification token 40 against this database. The second validation test may further comprise checking the token serial number and/or the IP address from which an incoming dCVV2 request was originated (the source IP address of the message) against the previously-described database that stores token serial numbers and IP addresses associated with requests that have failed the first validation test. If a token serial number or IP address is found in this database, the second validation test may be deemed to have been failed. Checking the token serial numbers and/or the IP addresses in this way prevents replay attacks by fraudsters. It may be appreciated that the database of serial numbers of tokens that failed the first validation test may be combined with the database of serial numbers of tokens involved in fraudulent activities. This combined database, as well as the two other databases, may be generically termed as a database of serial numbers of suspicious tokens. If the first and second validation tests are passed (e.g., encrypted serial number matches value in database, and no fraudulent use and/or suspicious activity by the token), validation entity 80 may send a dCVV2 value to verification token 40, or may apply additional validation tests before sending a dCVV2 value. Such an additional validation test pertains to checking the digital fingerprint or variable datum of portable consumer device 5. Validation entity 80 may have a stored record of the digital fingerprint of portable consumer device 5 or the algorithm for generating the variable datum of device 5, and can validate the received identification information by comparing the fingerprint or variable datum provided in the received information with the fingerprint or variable datum that it obtains from its stored record for device 5. If the additional validation test is passed, validation entity 80 may send a dCVV2 value to verification token 40. The additional validation test may be performed in addition to, or instead of, the previously described validation tests.

The dCVV2 value provided by validation entity 80 comprises a variable datum (e.g., a multi-digit number), and is used by the user to complete the purchase transaction. Verification token 40 may display the dCVV2 value to the user so that the user may enter the dCVV2 value into CVV field of the checkout page of the merchant's website, or verification token 40 may enter the dCVV2 value directly into the CCV field of the merchant's checkout page. After the dCVV2 value has been entered into the CVV field, the user may complete the purchase. This form of the dCVV2 value enables it to work within existing payment processing systems and flows. The merchant's website 20 then uses the dCVV2 value for the CVV in its authorization request for the purchase. The authorization request is sent to acquiring bank 50, which then forwards it to payment processing network 70 for authorization. Through a separate channel, validation entity 80 may send the dCVV2 value to payment processing network 70 and/or issuing bank 60, along with the account information (e.g., account number), so that the merchant's authorization request can be processed. This serves to notify payment processing network 70 and/or issuing bank 60 that a dCVV2 value for portable consumer device 5 was requested and provided to a merchant, and to expect the merchant to provide the dCVV2 value in an authorization request for the account.

Payment processing network 70 can compare incoming authorization requests from merchants (such as forwarded by acquiring banks) against the information it receives from validation entity 80 (such as by looking at account numbers), and can match (e.g., correlate) incoming authorization requests with validation information sent by validation entity 80. If a match is found, payment processing network 70 has a high degree of assurance that consumer portable device 5 was in the possession of user 1 at the time the purchase transaction was made. This provides a greater degree of assurance in comparison to the reliance on CCV values printed on the backs of credit cards. Payment processing network 70 and issuing bank 60 can then undertake the other actions that they perform to authorize the transaction, such as checking whether the merchant 20 is in good standing, and checking the account limit of user 1 to ensure that there are sufficient funds to cover the purchase amount of the transaction. In this case, payment processing network 70 does not need to validate the digital fingerprint and/or the variable datum of the portable consumer device 5, if those actions have been done by validation entity 80. (Payment processing network 70 may, however, perform those validation actions for merchant point-of-sales transactions.)

As a further feature, which is useful when multiple devices 5 have been allocated under one account number (e.g., multiple cards under one PAN for a household), the identification information that token 40 collects and provides to validation entity 80 may include a device identifier alone with the account number. This device identifier uniquely identifies one of the devices allocated under the account number. Provision entity 80 may further use the device identifier to obtain different dCVV2 values for the different devices allocated under the account number. As a further feature, validation entity 80 may send to token 40 shipping address information and/or billing address information of the user that has been previously associated to the device, and token 40 may fill this information into corresponding fields on the merchant checkout page.

Embodiments and components shown in FIG. 1 are now described in greater detail. The user's computer 10 may comprise a desktop computer, a laptop computer, or any portable electronic device that has a networking facility and a peripheral interface for communicating with one or more peripheral devices. Computer 10 has one or more processors 11, a tangible computer-readable medium 12 coupled to processor(s) 11 that stores instruction codes (software) that direct processor(s) 11 and that stores data used by processor(s) 11, and a user interface 13 coupled to processor(s) 11. Networking facility 14 and peripheral interface 16, which were previously described above, are also coupled to processor(s) 11, with networking facility 14 also being coupled to first communications network 31. User interface 13 comprises one or more video output devices (e.g., displays, screens) and one or more input devices (e.g., keyboard, mouse, trackball, etc.) for user 1 to receive information from computer 10 and to provide input to computer 10. Computer-readable medium 12 may comprise a combination of semiconductor memory and non-volatile storage, such as one or more disk drives and/or non-volatile memory. Computer-readable medium 12 stores an operating system for computer 10, which enables processes and applications to be run by processor(s) 11. The operating system provides services to these processes and applications, and enables these processes and applications to access components of user interface 13, portions of computer-readable medium 12, networking facility 14, peripheral interface 16, and other components of computer 10. The operating system may be complex and full featured, such as found on desk-top computers, or simplified, such as found on cell phones, PDAs, and many other types of portable electronic devices.

Networking facility 14 of computer 10 may comprise software and hardware that enable a process running on computer 10 to communicate with a communications network, such as network 31, to send and receive messages, data, and the like to one or more entities coupled to the communications network. The hardware of facility 14 may comprise dedicated hardware separate from processor(s) 11, or the shared use of processor(s) 11, or a combination thereof. The software of facility 14 may comprise firmware, software stored in computer-readable medium 12 or another computer-readable medium, portions of the operating system, or a combination of any of the preceding items. Networking facility 14 is preferably a non-exclusive resource, allowing access to the communications network by other processes and applications being run by computer 10. Peripheral interface 16 of computer 10 comprises one or more wired and/or wireless connections that enables a peripheral device (e.g., a device that is separate from the computer's CPU and memory but which can be located inside or outside of the computer's housing) to communicate with the computer. Conventional wired connections include universal serial bus (USB) connectors ("USB ports"), serial ports, parallel ports, and PCMCIA ports. Conventional wireless connections include infra-red (IR) base stations and Bluetooth™ base stations that are built into computer 10 or that are coupled to a peripheral interface of computer 10.

Figure 5:
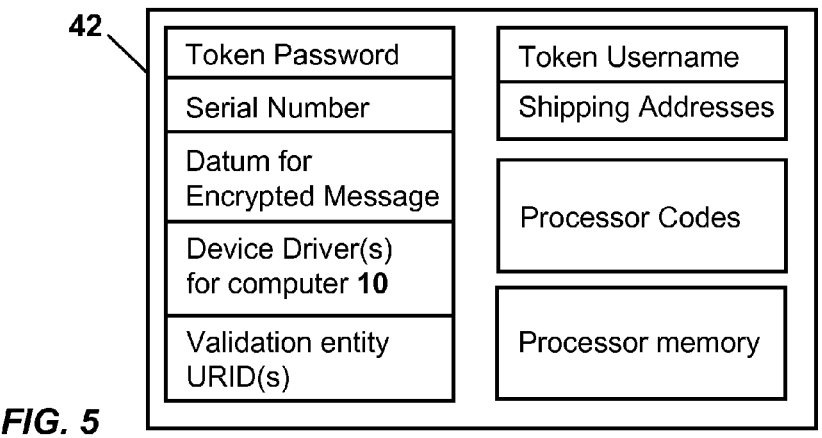
FIG. 5 illustrates an exemplary implementation of a computer-readable memory that can be used by a verification token.
Figure 6:
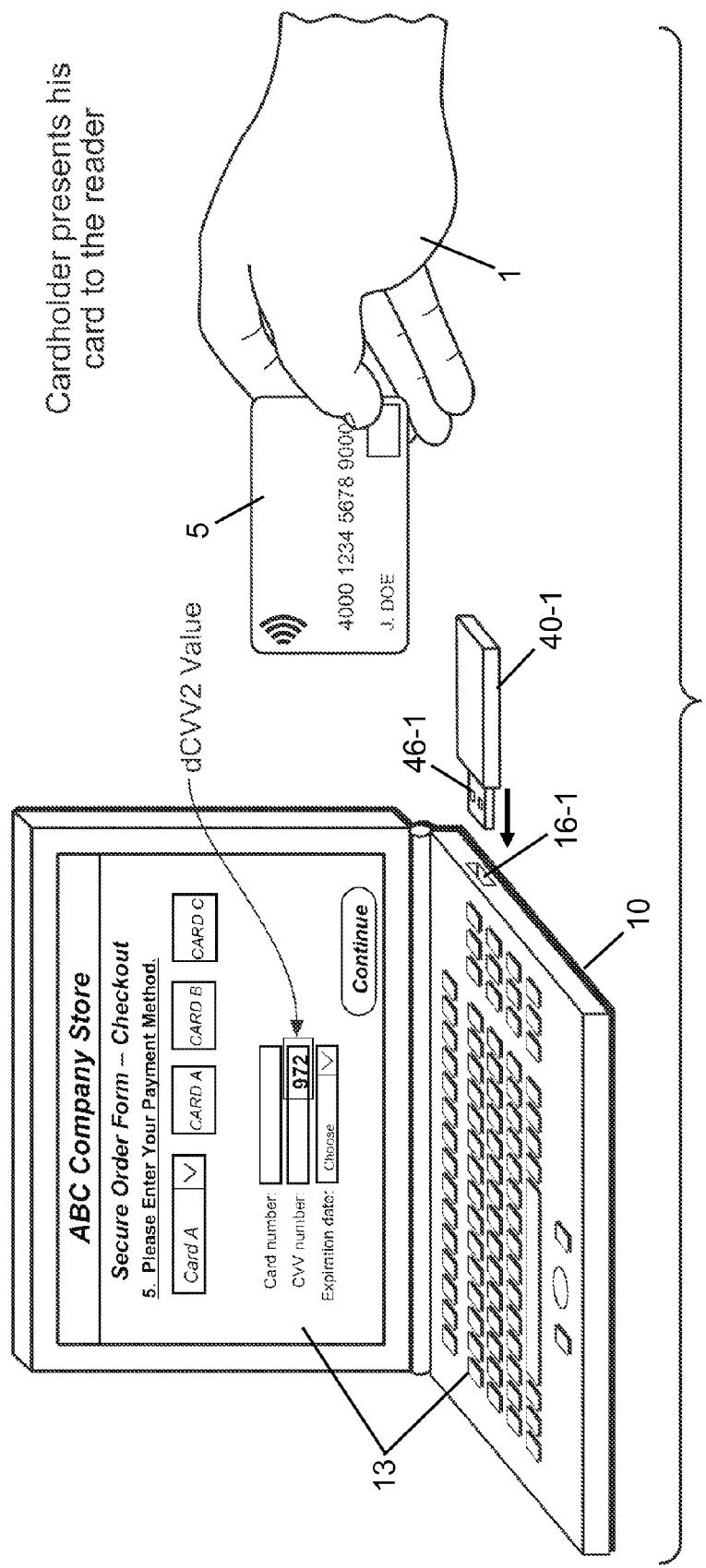
FIG. 6 illustrates an verification token and computer using USB connectors in the peripheral interfaces.

In addition to reader 44 and peripheral interface 46 (described above), verification token 40 further comprises a processor 41, a tangible computer-readable medium 42 coupled to processor 41 holding data and codes that direct the operation of processor 41, a security module 43 coupled to processor 41 and adapted to securely store one or more encryption keys and to encrypt and decrypt data for token 40, a reader 44 coupled to processor 41 and adapted to read portable consumer devices 5, and a peripheral interface 46 coupled to processor 41 and adapted to communicate to computer 10 by way of peripheral interface 16. Processor 41 may comprise a conventional microprocessor, and computer-readable medium 42 may comprise a combination of semiconductor memory and non-volatile storage, such non-volatile memory. FIG. 5 illustrates an exemplary implementation of computer-readable medium 42, which include the storage of several datum elements (described in greater detail below), processor codes that direct the operation of processor 41, and processor memory which processor 41 may use in carrying out its tasks. Referring back to FIG. 1, security module 43 may comprise encryption and decryption circuitry (which may include one or more processors), and may comprise one or more encryption keys stored in a secured memory. Security module 43 may also include firewall security circuitry that protects verification token 40 from attacks from hackers conducted through peripheral interface 16. Reader 44 may comprise a convention reader, as described above. Peripheral interface 46 may comprise a wired or wireless connection adapted to communicate with peripheral interface 16 of computer 10. As indicated above, conventional wired connections include universal serial bus connectors ("USB ports"), serial ports, parallel ports, and PCMCIA ports. Conventional wireless connections may include infra-red and Bluetooth™ remote stations. When using a conventional wired connection with peripheral interface 46, verification token 40 may be detachably coupled to computer 10 at peripheral interface 16, such as at a USB port connector. FIG. 6 illustrates an exemplary verification token 40-1 with a USB port connector (male type) as part of its peripheral interface 46-1. Also illustrate in FIG. 6 is computer 10, its peripheral interface 16-1 having a USB port connector (female type) to which USB connector 46-1 is plugged into, the user interface 13 of computer (e.g., screen and keyboard), the user's portable consumer device 5 (RFID-type card), user 1, and the presentation of a dCVV2 value on user interface 13. Token 40 may further include a visual indicator, such as a light-emitting diode (LED), that it lights when it is ready to read a user's device 5, and may further include an audible indicator, such as a piezoelectric buzzer, that sounds when token 40 is finished with reading a user's device 5. The visual and audible indicators may be operated by the circuitry of reader 44. In other implementations, one or more of these indicators may be operated by processor 41 through I/O commands. Although FIG. 6 illustrates an embodiment of verification token 40 as something similar to a USB stick, the token may come in other forms. For example, it may be piece of hardware or other module installed into a computer, consumer device, or other device. Examples of such forms are described below after this general description.

Referring back to FIG. 1, verification token 40 further comprises various codes embodied on computer-readable medium 42 that direct data processor 41 to perform respective actions (e.g. processor codes shown in FIG. 5). A first code directs data processor 41 to communicate with computer 10 by way of peripheral interface 46 so as to gain access networking facility 14 of computer 10. The first code may comprise code that directs data processor 41 to send a device driver to computer 10 and an instruction to install the device driver in the computer's operating system, wherein the device driver is a collection of instructions to be run by computer 10 that enables computer 10 to recognize the verification token and communicate with the verification token 40, and enables the token's data processor 41 to make function calls to various application program interfaces (API's) of the computer's operating system, such as those related to networking and accessing networking facility 14. So called "self-installing" drivers are known to the art, and can be used here. They comprise one or more function calls to an application programming interface (API) of the computer's operating system, such as the device manager's API. The first code may be configured to work with a selected operating system, such as Windows or Symbian OS, or may be configured to work with several operating systems. In the latter case, the first code may include several device drivers for the various operating systems, and instructions that query computer 10 for its operating system type and select (and install) the driver most appropriate for the computer's operating system. The device drivers may be stored in a section of computer-readable medium 42, as illustrated in the example of FIG. 5. The first code may further include, as an option, instructions that direct processor 41 to generate an I/O signal that causes the above-described visual indicator to be lit in response to processor 41 gaining access to networking facility 14 of computer 10.

Referring back to FIG. 1, a second code of verification token 40 directs data processor 41 to receive identification information read from portable consumer device 5 by the reader 44. The second code may include code that directs the data processor 41 to receive a universal resource identifier (URID) of a validation entity 80, as read from portable consumer device 5 by the reader 44. The second code may comprise instructions that direct processor 41 to contact reader 44 at periodic intervals through an I/O command to determine if the reader has any data for the processor, and to read the data when data is indicated as being present. The second code may further direct processor 41 to contact reader 44 through an I/O command to clear the data after processor 41 has read it, or reader 44 may be configured to clear the data after it has sensed that processor 41 has read it, or after a period of time greater than the periodic contact interval used by processor 41. In another implementation, reader 44 may be configured to generate an interrupt signal to processor 41 when data is present, and the second code may include instructions that direct processor 41 to respond to the interrupt signal by reading the data from reader 44 and clearing the interrupt. The second code may further include, as an option, instructions that direct processor 41 to generate an I/O signal that causes the above-described audible indicator to sound in response to processor 41 receiving data from reader 44. The above instructions may include conventional I/O instructions that direct the communications with reader 44 and the indicators. Different portable consumer device 5 may store and provide different URID's to different validation entities 80. A uniform resource identifier (URID) may comprise a uniform resource locator (URL), an Internet-protocol address (IP-address), or any other type of identifier that can identify an entity on a communications network. If a portable consumer device 5 does not provide a URID to validation entity 80, verification token 40 may store a URID to a default validation entity 80. In some configurations, some verification tokens 40 may be co-branded with respective issuing banks and only work for portable consumer devices that are co-branded with the same issuing banks, and each issuing bank may have its own validation entity 80 with its own URID. In such a configuration, these verification tokens 40 may store the URIDs to their respective co-branded validation entities 80. Instead of, or in addition to, this configuration, some verification tokens 40 may be associated with respective payment processing networks 70, and each such network may have its own validation entity 80. In such a configuration, these verification tokens 40 may store the URIDs to their respective associated validation entities 80. Accordingly, the second code of verification token 40 may be further configured to direct data processor 41 to only use a default URID stored by token 40, or to use a default URID if consumer portable device 5 does not provide token 40 with a URID to entity 80. As yet another implementation, verification token 40 may include code that directs processor 41 to select one of a number of URIDs stored in token 40 based on a bank number provided in the identification information or embedded in the account number. The above further direction and codes may be implemented with conventional I/O instructions, memory access instructions, and CPU logical and control instructions. One or more URIDs to validation entities may be stored in computer-readable memory 42, as illustrated in the example shown in FIG. 5.

Referring back to FIG. 1, A third code of verification token 40 directs data processor 41 to establish communications with validation entity 80 using networking facility 14 of computer 10. The operating system of computer 10 comprises one or more software modules and application programs, generically called "network services modules" herein, that can access networking facility 14 and set up communications sessions to entities on communications network 31. Such network services modules include Microsoft's Windows Communications Foundation (e.g., .NET 3.0, .NET 4.0, etc.), Apple's CFNetwork Framework, the networking section of the Unix and Linux operating system kernels, the OS Services Layer and the Base Services Layer of the Symbian operating system, Internet browsers, and the like. Each of these network services modules is non-exclusive (e.g., capable of serving more than one processor and more than one process/application) and provides an application programming interface (API) to a collection of functions that a processor can access using respective function calls. With these API facilities, a collection of function calls can be readily constructed for a processor to execute that enables the processor to establish a communications channel with an entity on a communications network coupled to networking facility 14, and to exchange messages and data with the entity. The third code of verification token 40 comprises such a collection of function calls to the API of a network services module of computer 10, including one or more function calls that provide the universal resource identifier (URID) for validation entity 80 and an instruction to establish a session with the validation entity. The session may be a secure socket layer (or secure transport layer) session (e.g., SSL session) with mutual authentication. As part of establishing the session in some implementations, the third code of verification token 40 may include directing data processor 41 to provide, or to cause to be provided, a network address for the token to the computer's network services module and to validation entity 80. The network address may be static or dynamic, the latter of which may be obtained through API function calls to the computer's network services module. The network address may an IP address.

If token 40 wishes to use an Internet browser for a network services module, it may further comprise API function calls to the computer's operating system to initiate an instance of the browser and provide it with access to the browser instance. In some implementations, such as when verification entity 40 stores the URID of validation entity 80, the third code may direct the data processor 41 to establish communications with validation entity 80 well before user 1 presents consumer portable device 5 to reader 44, and before processor 41 reads device data from reader 44. Verification token 40 and validation entity 80 may keep the communications session active until device 5 is presented to reader 44, and between times that device 5 is presented to reader 44, by intermittently exchanging "heartbeat" messages. For example, verification token 40 may periodically, aperiodically, or randomly send messages to validation entity 80 confirming its presence in the session, and validation entity 80 may send a reply message confirming its presence in the session.

The third code may be executed in response to data being received by processor 41 from reader 44, or may be executed prior to receiving data from reader 44. In the latter case, the third code may include, as an option, instructions that direct processor 41 to send an I/O command to reader 44 to enable its reading capability after processor 41 has established communications with validation entity 80.

A fourth code of verification token 40 directs the data processor 41 to transmit at least a portion of identification information to validation entity 80 by way of networking facility 14 of computer 10, wherein the identification information is transmitted in encrypted form. If an SSL session has been established, the fourth code may direct data processor 41 to pass the identification information to the computer's network services module using appropriate function calls to the API for the network services module, and the identification information may be transmitted in the SSL session, where the transmitted and received data are encrypted by a session key. For an additional layer of security, the fourth code may further comprise code that directs processor 41 to encrypt the identification information with the help of security module 43 using an encryption key stored in token 40 before providing it to networking facility 14. These instructions may include conventional I/O instructions that direct the communications with security module 43 to pass the identification information to module 43 and to receive back the encrypted information. An encryption key for this may be stored in computer-readable medium 42 or in security module 43.

A fifth code of verification token 40 directs data processor 41 to receive, after transmitting said identification information, a device verification value (e.g., dCVV2 value) from validation entity 80 by way of networking facility 14 of computer 10. This code may comprise function calls to the API of the computer's network services module to retrieve data sent by entity 80 in the session. The dCVV2 value may be encrypted by validation entity 80, in which case the fifth code of verification token may further direct data processor 41 to decrypt the encrypted value, such as by using security module 43 (with input-output instruction calls to module 43). The fifth code may include code that directs data processor 41 to display the received dCVV2 value to user 1, such as by way of the user interface 13 of computer 10 or a miniature LCD screen, or the like, integrated with verification token 40. In the former case, this code may comprise API function calls to the graphical user interface of the operating system of computer 10 to open a display box on user interface 13 to display the dCVV2 value in alphanumeric and/or graphical form. In the latter case, this code may comprise I/O instructions to the miniature LCD screen, or the like. In another implementation, verification token 40 may insert the received dCVV2 value in the CVV field of the merchant purchase page. In this case, the fifth code may further include code that directs data processor 41 to locate a browser session on the computer that has a form field for a device verification value, and to fill the field with the device verification value received from the validation entity. This can include function calls to the API of the Internet browser to search the active web page or all open web pages for an input field marked as CVV, and to input the dCVV2 value into the CVV field. Unlike an authorization code described above, a dCVV2 value in its clear form (e.g., not encrypted and not encoded) is preferably configured to be enterable into a CVV field of a merchant web page (e.g., checkout page).

In some implementations, the CVV field on the merchant's page may be configured as a hidden field that is not visible to the user. This may be done to ease the difficulty for the user in conducting the transaction, and to lessen the chances of the transaction falling through because of user confusion, technical difficulties, or the apparent demand for too much information. In this case, and as an option, the fifth code may comprise instructions that direct data processor 41 to locate a browser session on the computer that has a hidden field for a device verification value (e.g., the merchant's check out page), and to fill the field with the device verification value received from the validation entity. In this case, the device verification value need not be presented in visual form to the user. The hidden field can, in many web programming languages, be readily indicated by a tag identifier or browser variable that is known to both the merchant and token 40. If processor 41 cannot locate the hidden field, then the fifth code may further direct processor 41 to present the received device verification value to the user. These instructions can include function calls to the API of the Internet browser to search the active web page or all open web pages for the hidden field (as marked by the identifier or variable name), to input the dCVV2 value into the hidden field, and I/O instructions to an LCD screen or to computer 10 to visually present the dCVV2 value if the hidden field cannot be located, or function calls to the API of the Internet browser to visually present the dCVV2 value in a temporary browser window if the hidden field cannot be located.

In some configurations, validation entity 80 may provide a dynamic account number (often called a "dPAN" in the art) along with the dCVV2 value. For these configurations, the fifth code may be augmented to receive the dPAN along with the dCVV2 value, and to display the dPAN value to user 1 or to fill the value into an account field of the merchant purchase page, and include instructions similar to those described above for processing the dCVV2 value. Specifically, the fifth code may further include code that directs data processor 41 to display the received dPAN value to user 1, such as by way of the user interface 13 of computer 10 or a miniature LCD screen, or the like, integrated with verification token 40. In the former case, this code may comprise API function calls to the graphical user interface of the operating system of computer 10 to open a display box on user interface 13 to display the dPAN value in alphanumeric and/or graphical form. In the latter case, this code may comprise I/O instructions to the miniature LCD screen, or the like. In another implementation, verification token 40 may insert the received dPAN value in the account field of the merchant purchase page. In this case, the fifth code may further include code that that directs data processor 41 to locate a browser session on the computer that has form fields for an account number and device verification value (e.g., CVV field), and to fill the account field with the dPAN value and the device verification value field with the dCVV2 value received from the validation entity. This can include function calls to the API of the Internet browser to search the active web page or all open web pages for an input fields marked as "account number" (or "credit card number") and CVV, and to enter the dPAN value into the "account number" field and the dCVV2 value into the CVV field.

In some configurations, validation entity 80 may provide a billing address and/or shipping address (e.g., the user's residence address and/or business address) associated with the portable consumer device 5 along with the dCVV2 value. The address information may have been previously associated with the device 5 by the issuing bank or the user through the user's online management account for the device or token. For these configurations, the fifth code may be augmented to receive the billing address and/or shipping address along with the dCVV2 value, and to fill the address into a corresponding fields of the merchant purchase page, using instructions similar to those described above for processing the dCVV2 value. Specifically, the fifth code may further include code that directs data processor 41 to receive the billing and/or shipping address information from validation entity 80 (which may be provided in a specific format with field indicators), to locate a browser session on the computer that has form fields for billing and/or shipping address(es) (e.g., street address, city, state, postal code, country), and to fill these fields with the address information received from the validation entity. These instructions can include function calls to the API of the Internet browser to search the active web page or all open web pages for input fields marked with indicators of billing address and/or shipping address, and function calls to fill these fields.

The use of function calls to various application programming interfaces (APIs) of the operating system of computer 10 its support modules, facilities, and its applications is well known to the software art, and one of ordinary skill in the art will be able to construct instructions and API function calls to implement the above-described codes and tasks in view of this disclosure without undue experimentation.

Figure 2:
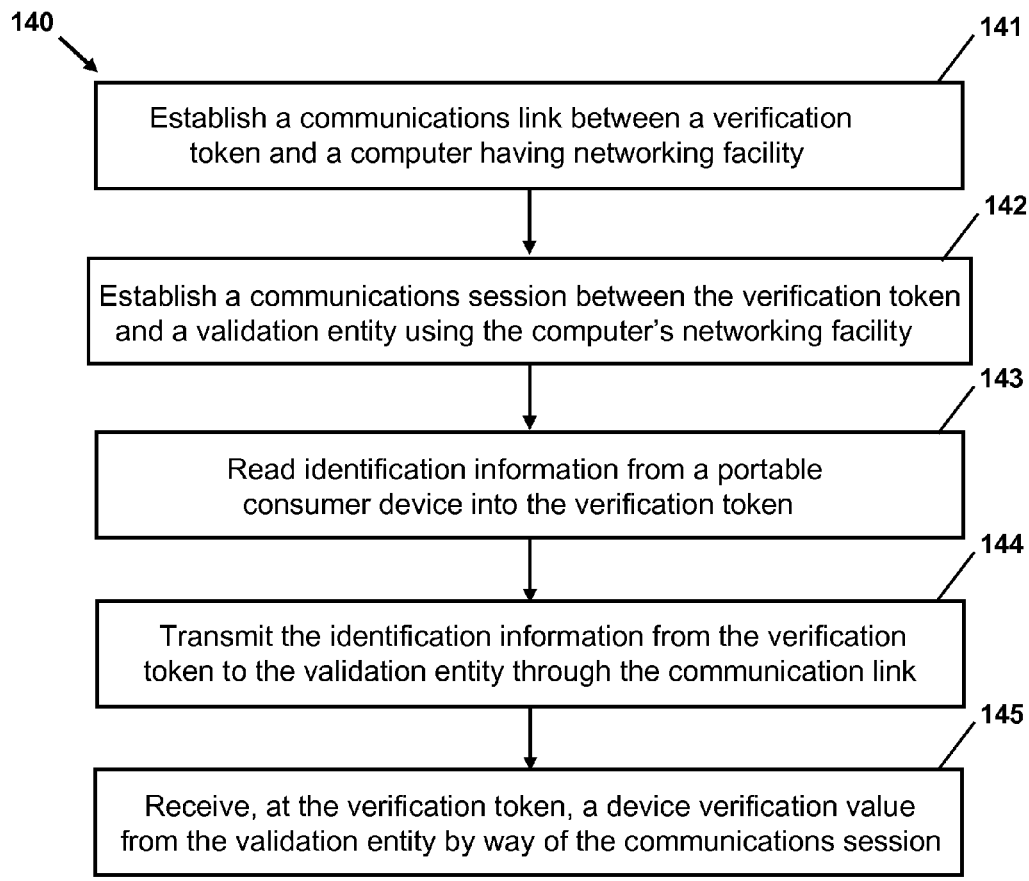
FIG. 2 illustrates an exemplary method embodiment that can be used by a verification token.

FIG. 2 illustrates an exemplary embodiment 140 of a method that can be used by verification token 40. Exemplary method 140 comprises a plurality of actions 141-145. Action 141 comprises establishing a communications link between the verification token and the computer, with the computer having a networking facility, as described above. Action 142 comprises establishing a communications session between the verification token and a validation entity using the computer's networking facility and a network services module therefore. Action 143 comprises reading identification information from a portable consumer device 5 into the verification token using a reader, such as reader 44. In some implementations, action 143 may precede either or both of actions 141 and 142. Action 144 comprises transmitting the read identification information from the verification token to the validation entity through the communications session, the identification information being transmitted to the validation entity in an encrypted form. Action 144 may comprise directing the communications session to encrypt the identification information, and/or encrypting the identification information using an encryption key stored in the token. A triple DES based algorithm may be used for both encryptions. Action 145 comprises, after transmitting the identification information, receiving, at the verification token, a device verification value from the validation entity by way of the communications session. Action 145 may also include receiving a dPAN and/or address information, as described above.

Figure 3:
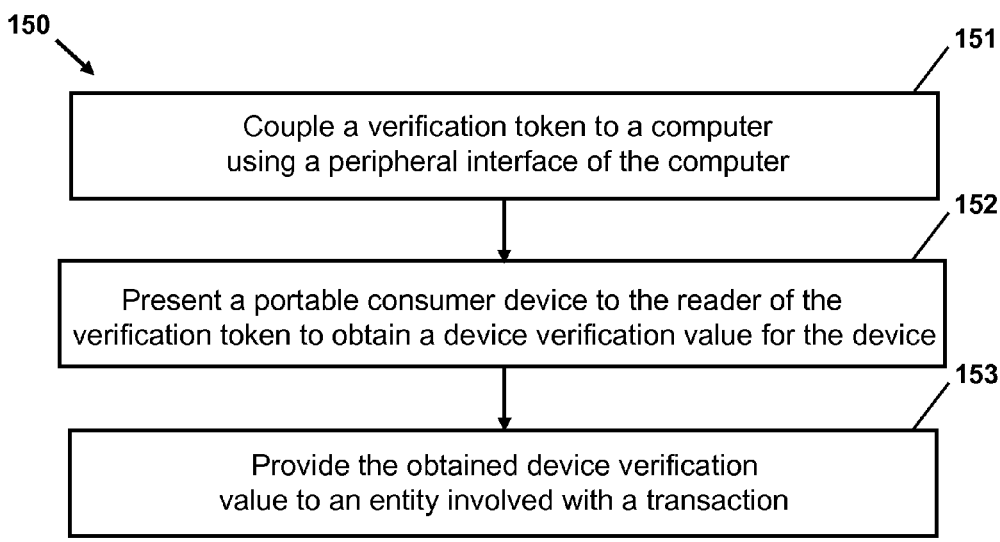
FIG. 3 illustrates an exemplary method embodiment that can be used by a user of a verification token.

FIG. 3 illustrates an exemplary embodiment 150 of a method for a user to use verification token 40 and the like. Exemplary method 150 comprises a plurality of actions 151-153. Action 151 comprises coupling a verification token, such as token 40, to a computer, such as computer 10, using a peripheral interface of the computer. Action 152 comprises presenting a portable consumer device 5 to the reader of the verification token to obtain a device verification value for the device. If device 5 has a magnetic stripe, action 152 may comprise swiping the magnetic stripe through a magnetic stripe reader of the verification token. If device 5 comprises a wireless communications interface, action 152 may comprise waving device 5 near the reader of verification token. Action 153 comprises providing the obtained device verification value to an entity involved with a transaction between the user and the entity. Action 153 may comprise entering the device verification value onto a webpage of entity, or conveying the value over the phone to a representative of the entity.

As indicated above, validation entity 80 may use a first validation test to validate verification token 40. For this, verification token 40 may send its serial number to validation entity 80, along with a message encrypted by an encryption key, with the message and encryption key being known to token 40 and entity 80 (but not the general public), and with the encryption key further being uniquely assigned to the token's serial number. Validation entity 80 has a database of serial numbers and the corresponding uniquely-assigned encryption keys (or stored algorithms for generating said keys), and can validate that verification token 40 has sent the correct message for the serial number. For this, verification token 40 may comprise a serial number and unique encryption key embodied in a computer-readable medium, the unique encryption key being unique to verification token 40 (see FIG. 5 for an exemplary implementation, "Serial Number" and "Datum for Encrypted message"), and code that directs data processor 41 to send the serial number and a message encrypted by the unique encryption key to validation entity 80. The message may be pre-stored on the computer-readable medium (e.g., stored in "Datum for Encrypted message" in FIG. 5), or derivable from information known to both verification token 40 and validation entity 80, such as a message derived from an algorithm applied to the current date, serial number of token 40, and/or session key of the communications session between token 40 and entity 80. In this manner, the message sent by token 40 to validation entity 80 is verifiable by validation entity 80 using information stored at the validation entity. The computer-readable medium for the above tasks may be located in computer-readable medium 42 and/or security module 43. The above codes may include I/O instructions to security module 43, and function calls to the API of the computer's network services module.

As an option, verification token 40 may send, from time to time, one or more pieces of machine-unique information of computer 10 to validation entity 80, which may check this information against a database of computer information associated with known fraudsters. Such machine-unique information may include the serial numbers of processors, disk drives, and operating systems of computer 10. Verification token 40 may comprise code that directs data processor 41 to obtain one or more pieces of machine-unique information from computer 10, and to send the machine-specific information to validation entity 80. This code may include function calls to the API of the computer's operating system to obtain the information, and function calls to the API of the computer's network services module to send the information to validation entity 80.

As another option, verification token 40 may be configured to prompt user 1 for a password to activate one or more features of token 40. The password may be stored on a computer-readable medium located in security module 43 or in computer-readable medium 42 (see FIG. 5 for an exemplary implementation of the latter). The password may be provided to user 1 on a piece of paper by the provider or seller of token 40. Token 40 may be sent to user 1 through the mail by or on behalf of an issuing bank, or may be purchased by user 1 in a store. Token 40 may be configured to require that the password be entered each time the user wishes to present a consumer portable device 5, and/or each time token 40 is coupled to a computer 10. For this, verification token 40 may further comprise code embodied on computer-readable medium 42 that directs data processor 41 to prompt the user to enter a password on a keyboard of computer 10, to read a password entered by the user, and to compare the entered password against a stored password embodied on the computer-readable medium. This code may comprise API function calls to the graphical user interface of the operating system of computer 10 to open a display box on user interface 13 to request and receive a password from user 1, I/O instructions, memory access instructions, and CPU logical and control instructions.

Verification token 40 may further comprise one or more of the following:

(1) code embodied on computer-readable medium 42 that directs data processor 41 to initiate and/or allow the above-described communications with computer 10 in response to an entered password matching the stored password;

(2) code embodied on computer-readable medium 42 that directs data processor 41 to initiate and/or allow the above-described communications with validation entity 80 in response to an entered password matching the stored password;

(3) code embodied on computer-readable medium 42 that directs data processor 41 to activate reader 44 and/or to accept identification information from reader 44 in response to an entered password matching the stored password; and (4) code embodied on computer-readable medium 42 that directs data processor 41 to initiate and/or allow the above-described transmission of identification information to validation entity 80 in response to entered password matching the stored password.

These codes may be done with I/O instructions, memory access instructions, and CPU logical and control instructions. They, alone or in combination, prevent the transmission of identification information to entity 80 when the entered password is not the same as the stored password, and thereby comprise code embodied on the computer-readable medium that directs the data processor for doing so. One of ordinary skill in the art will be able to construct the instructions and API function calls to implement the above-described codes in view of this disclosure without undue experimentation. As further protection, validation token 40 may further comprise code embodied on computer-readable medium 42 that directs data processor 41 to establish a user name for the token by presenting user 1 with a dialog box to receive input designating a username, and by storing the username in computer-readable medium 42 (example shown in FIG. 5). The above codes for processing the password may be further augmented to include requesting a username for the token and comparing the received username with the stored username for a match, and including a match as a condition that must be met in each of the four above codes that initiate or allow various actions to be done. These codes may be done with I/O instructions, memory access instructions, and CPU logical and control instructions.

In further implementations, as further protection, validation token 40 may further comprise code embodied on computer-readable medium 42 that directs data processor 41 to establish one or more shipping addresses and/or billing addresses in the token that token 40 can use to fill into form fill locations of a merchant page. Each shipping address and/or billing address may be associated with a portable consumer device. The code may direct processor 41 to present a series of dialog boxes to the user by way of the computer's user interface 13 to receive the address information and the account number (or last four digits thereof) of the portable consumer device 5 that is to be associated to the address information, and to store the address information in a computer-readable medium, such as medium 42 (as illustrated by the example shown in FIG. 5). Token 40 may further comprise code embodied on computer-readable medium 42 that directs data processor 41 to access the address information in response to a request being sent to validation entity 80 (the address information may be selected among many stored addresses based on the account number sent in the request), and to fill the address information into appropriate locations of a merchant checkout page, such as when a dCVV2 value is received back from validation entity 80. The code may be configured to direct processor 41 to only fill in the address information when the locations for the information on the merchant checkout page are blank, and when validation entity 80 has not provided address information, as described above. The filling code may be further configured to direct data processor 41 to use shipping and/or billing information stored on portable consumer device 5 when shipping and/or billing information is not store in token 40 for the account number of device 5, and further if the locations for the shipping information on the merchant checkout page are blank and validation entity 80 has not provided address information, as described above. The filling code may include code that directs data processor 41 to locate a browser session on the computer that has a form fields for address information and/or a device verification value, and to fill the address fields with the selected address information. This can include function calls to the API of the Internet browser to search the active web page or all open web pages for an input field marked as name, address, city, postal code, country, and CVV, and to input the datum of the selected address information into the appropriate fields. The above codes may be implemented with API function calls, I/O instructions, memory access instructions, and CPU logical and control instructions.

In each of the embodiments described herein pertaining to verification token 40, token 40 may send the identification information pertaining to portable consumer device 5 to computer 10 in a number of forms, including: (1) unaltered form ("clear form"), (2) encrypted form, (3) hashed formed (e.g., encoded), (4) signed form, (5) or any combination of these forms. These forms may be generated by portable consumer device 5, verification token 40, computer 10, or any combination thereof. In addition, verification token 40 and validation entity 80 may perform a mutual authentication process before verification token 40 sends the identification information.

In each of the embodiments described herein pertaining to verification token 40, the above codes of token 40 and the identification information read from device 5 by token 40 may be stored independently of computer 10 and may be secure from programs (including spyware and other malicious programs) running on computer 10. In such implementations, the identification information is put in secure form (e.g., encrypted, hashed, signed, or combination thereof) by verification token 40 before the information is provided to computer 10. Accordingly, securing the information is not dependent upon the security of computer 10. Symmetric or asymmetric keys may be used for encryption and signing. The keys for a verification token 40 may be unique with respect to other verification tokens (that is, the keys for a token may be unique to that token). Keys for a token, and particularly symmetric keys, may be based upon a uniquely assigned serial number for the verification token, which the token can communicate to validation entity 80 in an initial communication. Both the verification token and the validation entity may have a shared secret on how to derive a key from the token's serial number, such as by manipulating and/or replacing selected digits of the serial number. A number of keys may be derived from the unique serial number using respective shared secrets. Thus, the challenge and response messages used in a mutual authentication process between a verification token and a validation entity may be signed using respective keys derived from the serial number of the verification token.

Figure 8:
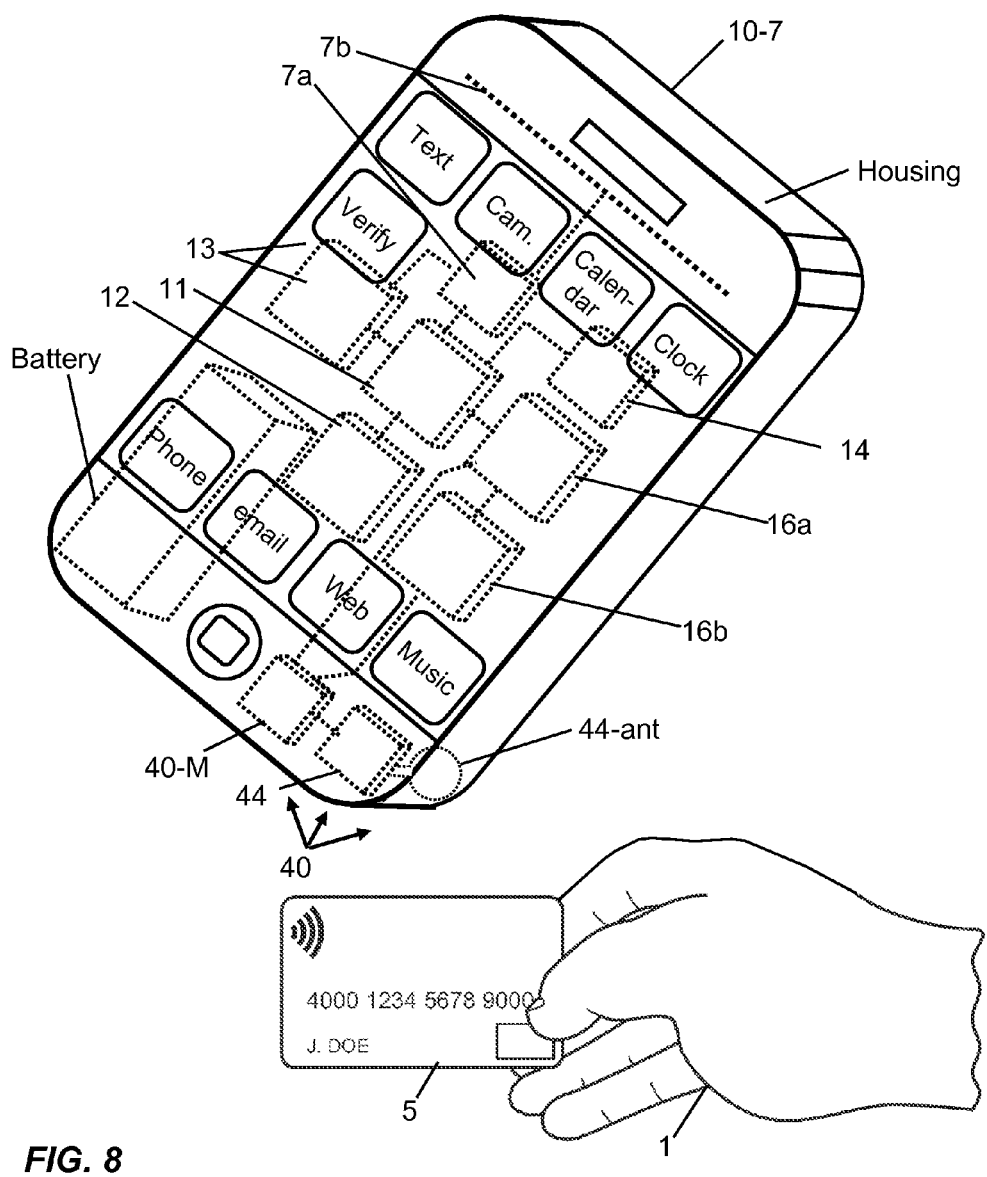

Integrated Embodiments. In some implementations, the user's computer 10 and personal communication device 7 may be integrated together as a single unit, and verification token 40 may be physically incorporated within the unit's housing. While verification token 40 is disposed within the unit's housing, it is still adapted to be communicatively coupled to a peripheral interface 16 of computer 10, as described above. This implementation is illustrated in FIG. 8 by a combined device 10-7, which may take the form of an Apple iPhone. Device 10-7 comprises the processor 11, memory 12, user interface 13, networking facility 14 and peripheral interface 16 of computer 10, as described above, including their interconnections with one another. User interface 13 preferably comprises a touch-screen display that can display icons and graphical information to the user, and that can receive selections of icons from the user by the detection of finger pressure on the screen in a location disposed over the selected icon. These components are disposed within the housing of device 10-7, as illustrated by the dashed outlines of the components and their interconnections. The peripheral interface 16 may comprise an input-output controller 16a that is electrically coupled to processor 11, and a USB controller 16b that is electrically coupled to input-output controller 16a. Device 10-7 also comprises telephony circuitry 7a and antenna 7b of personal communications device 7. Antenna 7b may be disposed in the device's housing or on the device's housing. Telephony circuitry 7a is disposed within the device's housing, and is electrically coupled to processor 11, either directly or through input-output controller 16a. Telephony circuitry 7a may be coupled to one or more portions of user interface 13, such as a speaker and microphone, either directly or indirectly through processor 11, depending upon implementation. All of these components are powered by a battery disposed within the housing of device 10-7, and may be disposed on one or more circuit substrates, which may be rigid and/or flexible.

Figure 9:
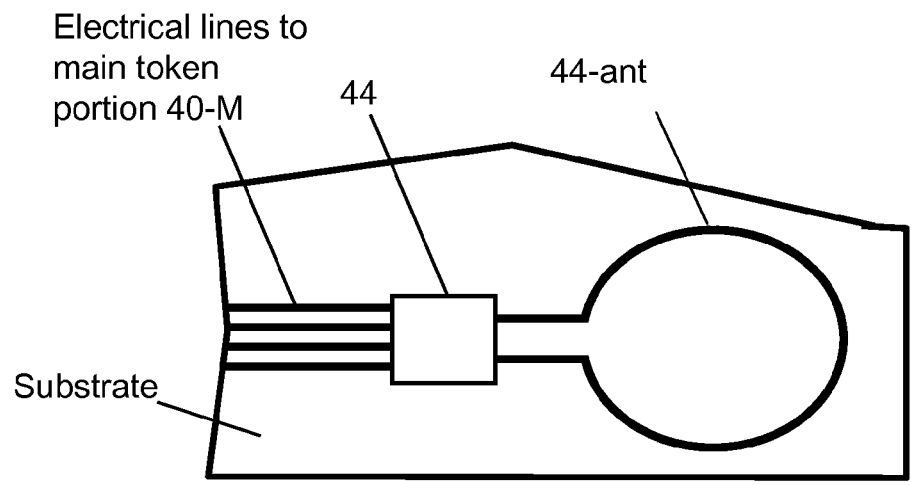
FIGS. 8-12 illustrate various exemplary embodiments of a verification token.

As shown in FIG. 8, token 40 is also disposed with the housing of device 10-7, and may be communicatively coupled to the computing components of device 10-7 by way of an internal peripheral interface, such as by a miniature USB cable (shown by a dotted line) that connects to internal USB controller 16a described above, thereby providing an internal USB interface connection between token 40 and the computing components of device 10-7. Token 40 communications with USB controller 16b using communication data packets transmitted in each direction on the miniature USB line. Token 40 is also supplied with power from the battery that supplies the other components of device 10-7. Token 40 may be disposed on one of the above-described substrates of device 10-7, or may be disposed on its own substrate or in its own package that is attached to the device's housing. The various components 41-46 of token 40 may be integrated together as one or more semiconductor dice, and/or semiconductor die packages. The antenna 44-ant (e.g., pick-up coil) of the token's reader 44 may be implemented as one or more coiled loops of conductive material formed in one or more layers of conductive traces of a substrate, as illustrated in FIG. 9. User 1 can present a portable consumer device 5 to device 10-7 by moving device 5 to a location near antenna 44-ant. Token 40 may be distributed in two or more parts within device 10-7. For example, the token's card reader 44 or a portion of the card reader 44 (e.g., antenna/pick-up coil, combination of antenna/pick-up coil and amplifier, etc.) may be disposed near an edge of the device's housing, and the remaining portion 40-M of token 40 may be disposed closer to USB controller 16b. This distributed implementation is illustrated in FIG. 8. A miniature USB line (shown by a dotted line) connects main token portion 40-M to a downstream port of USB controller 16b, and a set (shown by a dotted line) of one or more wires connects the main token portion 40-M to the reader 44 or portion thereof. The distributed configuration has the advantage of enabling the reader portion of token 40 to be located in an area of low-electrical noise while enabling the main token portion 40-M to be located in a secure area of the device's motherboard.

In the above implementation, the USB controller 16b may be replaced by a wireless Bluetooth controller (e.g., transceiver), and verification token 40 may comprise a Bluetooth transceiver (i.e., wireless transceiver) that communicates with the Bluetooth hub (e.g., transmits and receives) using communication packets. In addition, other types of communications controllers, hubs, and transceivers may be used.

As part of making some of the inventive features of this application, the inventor recognizes that maintaining the duration of the device's battery will enhance the usability and user acceptance of verification token 40, as incorporated within device 10-7. As a first power-saving feature, card reader 44 has a first operating state to detect the presence of a portable consumer device 5 within a selected distance of the card reader, and a second operating state to obtain information from a portable consumer device 5. The first operating state consumes less power from the battery than the second operating state. Reader 44 may move from its first operating state to its second operating state when the presence of a portable consumer device 5 is detected. In the first operating state, reader 44 may power down portions of its circuitry that are only needed when exchanging data packets with of a portable consumer device 5, and may power up these circuitry portions during the second operating state. After information has been obtained from a portable consumer device 5, reader 44 may transition from its second operating state to its first operating state.

Processor 41 of token 40 may have a first operating state where information from a portable consumer device 5, as obtained by reader 44, is not processed, and a second operating state where said information is processed. The first operating state consumes less power from the battery than the second operating state. Processor 41 moves from its first operating state to its second operating state in response to information being obtained from a portable consumer device by card reader 44. In one implementation, processor 41 comprises digital CMOS circuitry and operates at a first clock frequency in the first operating state, and a second clock frequency in the second operating state, where the first clock frequency is less than the second clock frequency. (As is known in the art, the amount of power consumed by digital CMOS circuitry is proportional to the frequency at which the circuitry is clocked; so reducing the clocking frequency in the first operating state reduces the power consumption with respect to the second operating state.) A clocking circuit that provides a clocking signal to token processor 41 may receive a signal from card reader 44 indicating that portable consumer device 5 has been presented, and, in response, may increase the clock frequency to processor 41. As another approach, token processor 41 may receive an interrupt signal from card reader 44 indicating that it has obtained information from a portable consumer device, or may poll an output port of reader 44 to see if obtained information is present. In response, processor 41 may switch from the first operating state to the second operating state, and obtain the information from card reader 44 and process it as previously described above. After processing, processor 41 may then return to its first operating state until it receives the next interrupt signal from card reader 44. Processor 41 may also send I/O signals that cause power to token components 42, 43, and/or 46 (shown in FIG. 1) to be reduced or cut during the first operating state, and resumed during the second operating state.

Figure 10:
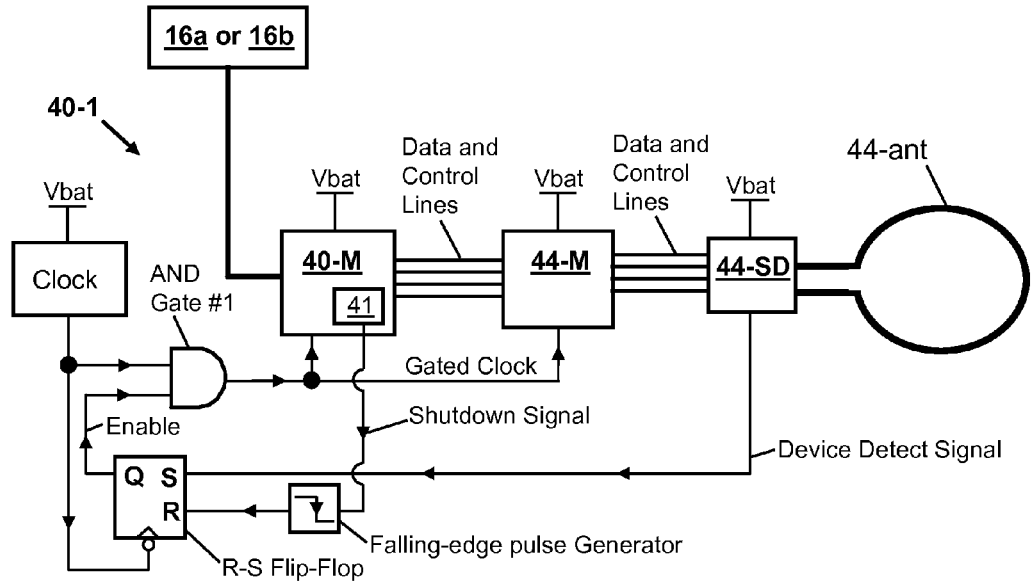

FIG. 10 shows an exemplary embodiment 40-1 of Token 40 that illustrates some of the above configuration and actions. Processor 41 (shown in FIG. 1) and the other components besides the card reader are grouped together in circuit box 40-M, and card reader 44 is divided into three components: antenna 44-ant, a detect circuit 44-SD, and a main part 44-M of reader 44. CMOS digital circuitry is used for the components, and all components are continuously connected to the battery Vbat of device 10-7. A first set of data and control lines is provided between circuit box 40-M and main part 44-M of the card reader, and a second set of data and control lines is provided between main part 44-M and detect circuit 44-SD. Detect circuit 44-SD periodically emits an electro-magnetic communication signal to elicit a response from a portable consumer device within a selected distance of the antenna 44-ant, such as about 8 centimeters, and listens for a response. During this time, the clock signal to circuit box 40-M (including processor 41) and the main part 44-M of the card reader is stopped, which places these components in a state of suspended animation. When detect circuit 44-SD receives a response to one of its periodic communication signals, it activates a Device Detect Signal, which causes the clock signal to be started to components 40-M and 44-M by way of the "Gated Clock" signal shown in FIG. 10. A clocking circuitry, as more fully described below, performs the starting of the clock signal. The main part 44-M of the card reader resumes its operation (as previously described above with response to previous embodiments) and communicates with the nearby portable consumer device to obtain the device's identification information. Circuit box 40-M, which includes processor 41, also resumes its operation, and processes the identification information once it is received from main part 44-M of the card reader, as described above with respect to previous embodiments. Once processor 41 has completed all of its tasks related to obtaining and processing a dVCC2 value for the nearby portable consumer device, it issues a "Shutdown Signal" pulse to the clocking circuitry, which causes the clock signal to components 40-M and 44-M to be stopped. For this, processor 41 may have an I/O signal line that provides the Shutdown Signal, and the above-described instruction sets for directing the operation of processor may have an additional instruction that directs processor to activate the Shutdown Signal, such as with a logic-high pulse on the corresponding I/O line. Detect circuit 44-SD may comprise the conventional smartcard detection circuit with the following modifications: it receives an uninterrupted clock signal, and its Device Detect Signal is made available for other circuitry besides the card reader. In view of the description herein, it is within the ability of one of ordinary skill in the art to construct detect circuit 44-SD without undue experimentation.

The clocking circuitry shown in FIG. 10 may operate as follows. The Clock signal is provided to components 40-M and 44-M through a first AND gate #1. The clock signal is fed to the top input of the first AND gate, and an Enable signal is fed to the bottom input of the first AND gate. The output of the AND gate is coupled to the clock inputs of components 40-M and 44-M. When the Enable signal is logic high, the clock signal is provided to the components, and when the Enable signal is logic low, the clock signal is stopped. The Enable signal is generated at an output "Q" of a negative-edge triggered R-S flip-flop, which toggles its Q output between logic-high and logic-low states depending upon the sequence of input signals provided at its Set input "S" and Reset input "R". The Q output goes to the logic-high state whenever the S input is at a logic-high state during a falling edge of the Clock, and the Q output goes to the logic-low state whenever the R input is at a logic-high state during a falling edge of the Clock. The Device Detect Signal from detect circuit 44-SD circuit is provided to the S input. Device Detect Signal is configured to only last for a small number of clock cycles, but this is sufficient time to set the R-S flip-flop during the next falling edge of the Clock signal after the Device Detect Signal goes to a logic-high state. When the R-S flip-flop is set in this manner, the Q output of the flip-flop goes to a logic-high state during the next logic-low state of the Clock signal after said falling edge, which makes AND Gate #1 ready to provide the Clock signal to components 40-M and 44-M at the next rising edge of the Clock signal.

The Shutdown Signal from processor 41 is coupled to the R input (reset) of the R-S flip-flop through a falling-edge pulse generator. In response to processor 41 generating a logic-high pulse on the Shutdown Signal line, the falling-edge pulse generator generates a second logic-high pulse at its output after the logic-high pulse on the Shutdown Signal line has completed. The pulse from the pulse generator is configured to only last for a small number of clock cycles, but this is sufficient time to reset the R-S flip-flop during the next falling-edge of the Clock signal. When the R-S flip-flop is reset in this manner, the Q output of the flip-flop goes to a logic-low state during the next logic-low state of the Clock signal after said falling edge, which makes AND Gate #1 shutdown the Clock signal to components 40-M and 44-M during the logic-low state of the Clock. The delay action provided by the falling-edge pulse generator allows processor 41 to complete its instructions for generating the Shutdown signal before it is placed in suspended animation (e.g., sleep mode). The falling-edge configuration of the R-S flip-flop regulates the change in the Q output of the flip-flop so that the conveyance of the clock signal through first AND Gate #1 to components 40-M and 44-M is not disturbed during the logic-high state of the Clock signal. Otherwise, a logic-high state present at the inputs of an unclocked R-S flip-flop during the middle of the logic-high state of the Clock would cause a shortened clock signal at the output of first AND Gate #1, and may cause unpredictable actions in components 40-M and 44-M.

Token 40-1 comprises the instruction sets described above for token 40, and further comprises a main routine that comprises the following further instructions: (1) a first instruction that directs data processor 41 to communicate with the main part 44-M of the card reader to determine if the reader has obtained identification information for a device 5, and, if so, to execute the previously-described instructions that obtain and process the identification information of device 5 to obtain a dCVV2 value; (2) after executing the first instruction, a second instruction that directs data processor 41 to issue the Shutdown signal to start a sleep mode and to prepare to execute the first instruction set again after the completion of the sleep mode.

In another implementation, processor 41 enters a sleep mode during the first operating state, and periodically wakes up during a "wake-up mode" to determine if the aforementioned interrupt signal from card reader 44 is present, or to poll an output port of reader 44 to see if obtained information is present. If not, processor 41 returns to the sleep mode. If the interrupt signal is present, or if a polling of the output port of reader 44 indicates that information is present, processor 41 enters its second operating state. The wake-up mode of the first operating state and the second operating state may have the same clock frequency of operation. In sleep mode, the clock may be stopped for a selected duration of time. The clock may then be restarted after this duration to put processor 41 in the wake-up mode. This controlling of the clock may be implemented by disposing a programmable gate element between the output of a continuously-powered clock and processor 41. Processor 41 can instruct the gate element to block the clock signal from processor 41 for a selected number of clock cycles to enter the sleep mode, and to thereafter allow the clock signal to flow to processor 41 to enter the wake-up mode. Processor 41 can issue the blocking instruction to the gate element after it finishes processing the information from device 5 during the second operating state, or after it finds no information to be processing during a wake-up mode. The other components 42, 43, and 46 (shown in FIG. 1) of token 40 may be fed by the same gated clock as processor 41, and thereby may enter sleep modes when processor 41 enters its sleep mode.

Figure 11:
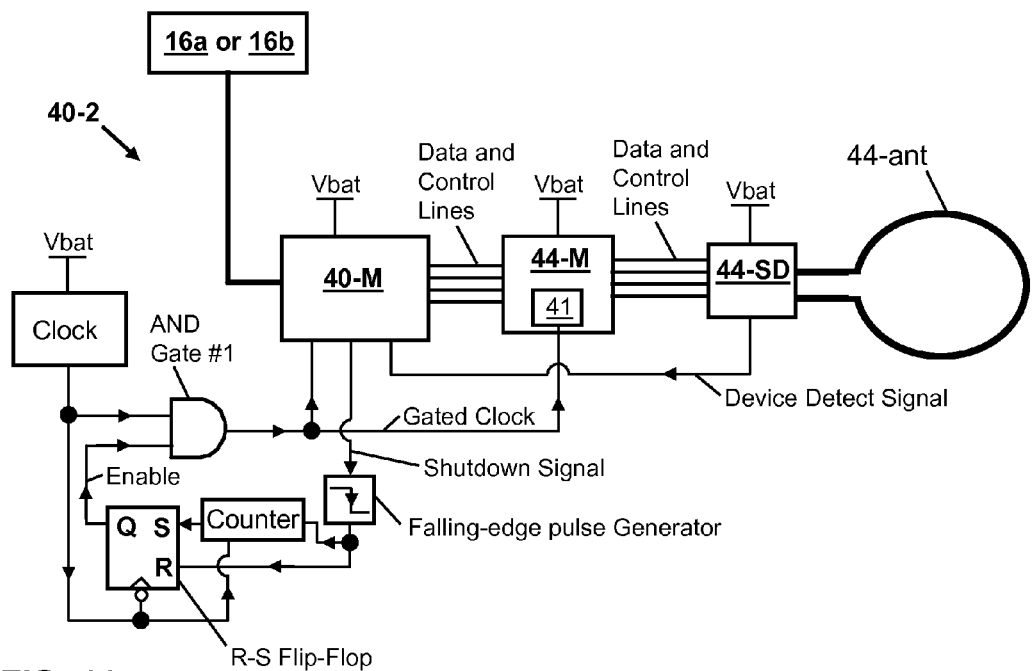

FIG. 11 shows an exemplary embodiment 40-2 of Token 40 that illustrates the above configuration and actions. Like token 40-1 shown in FIG. 10, processor 41 (shown in FIG. 1) and the other components besides the card reader are grouped together in a circuit box 40-M, and card reader 44 is divided into three components: antenna 44-ant, a detect circuit 44-SD, and a main part 44-M of reader 44. CMOS digital circuitry is used for the components, and all components are continuously connected to the battery Vbat of device 10-7. A first set of data and control lines is provided between circuit box 40-M and main part 44-M of the card reader, and a second set of data and control lines is provided between main part 44-M and detect circuit 44-SD. The Clock signal is provided to components 40-M and 44-M through a first AND Gate #1. The Clock signal is fed to the top input of first AND gate #1, and an Enable signal is fed to the bottom input of the first AND gate. The output of the AND gate is coupled to the clock inputs of components 40-M and 44-M. When the Enable signal is logic high, the clock signal is provided to the components, and when the Enable signal is logic low, the clock signal is stopped.

The Enable signal is generated at the Q output of a negative-edge triggered R-S flip-flop, which toggles its Q output between logic-high and logic-low states depending upon the sequence of input signals provided at its S input and R input, as described above. The falling-edge configuration of the R-S flip-flop regulates the change in the Q output so that the conveyance of the clock signal through first AND Gate #1 to components 40-M and 44-M is not disturbed during the logic-high state of the Clock signal. Like Token 40-1 shown in FIG. 10, the Shutdown Signal from processor 41 is coupled to the R input of the R-S flip-flop through a falling-edge pulse generator. In response to processor 41 generating a logic-high pulse on the Shutdown Signal line, the falling-edge pulse generator generates a second logic-high pulse at its output after the logic-high pulse on the Shutdown Signal line has completed. The pulse from the pulse generator is configured to only last for a small number of clock cycles, but this is sufficient time to reset the R-S flip-flop during the next falling edge of the Clock signal. When the R-S flip-flop is reset in this manner, the Q output of the flip-flop goes to a logic-low state during the next logic-low state of the Clock signal, which makes AND Gate #1 stop the Clock signal to components 40-M and 44-M during the logic-low state of the Clock. The delay action provided by the falling-edge pulse generator allows process 41 to complete its instructions for generating the Shutdown signal before it is placed in the sleep mode (suspended animation).

A countdown Counter has a start input coupled to the output of the pulse generator, and begins counting from a selected high number down to zero upon receiving the logic-high pulse from the pulse generator. Upon receiving the logic-high pulse at its input, and during its countdown operation, the countdown counter generates a logic-low state at an output. This output is coupled to the S input of the R-S flip-flop. When the counter reaches zero, it outputs a logic-high state on its output, which causes the R-S flip-flip to output a logic-high state on its Q output, which in turn causes first AND gate #1 to couple the Clock signal to components 40-M and 44-M. The Clock is provided to components 40-M and 44-M until the next time processor 41 issues the Shutdown Signal. Upon initial power up, the countdown counter is configured to be at zero and outputting a logic-high value at its output so that a clock signal is initially provided to processor 41 upon power up. The countdown Counter is fed by the Clock signal, and can be constructed so that the period of the sleep mode is in a selected range of time, such as 1 microsecond to several seconds, with a period of time in the millisecond range being typical.

Detect circuit 44-SD periodically emits an electro-magnetic communication signal to elicit a response from a nearby portable consumer device 5, if present, and listens for a response. When detect circuit 44-SD receives a response to one of its periodic communication signals, it activates a Device Detect Signal to indicate that a device 5 is present. The Device Detect Signal from detect circuit 44-SD circuit is provided to an I/O input of processor 41 so that the processor can monitor the signal to determine if a device 5 is present. Token 40-2 comprises the instruction sets described above for token 40, and further comprises a main routine that comprises the following further instructions: (1) a first instruction that directs data processor 41 to obtain the current value of the Device Detect signal from detect circuit 44-SD and determine if the signal indicates that a portable consumer device 5 is present, and, if so, to execute the previously-described instructions that obtain and process the identification information of device 5 to obtain a dCVV2 value; (2) after executing the first instruction, a second instruction that directs data processor 41 to issue the Shutdown signal to start a sleep mode and to prepare to execute the first instruction set again after the completion of the sleep mode. Detect circuit 44-SD is further configured to generate the Device Detect Signal in its active state for at least the period of time of the sleep mode.

In another implementation, token 40 may be powered on by user 1 activating an icon button on the display of user interface 13, and may power itself off after it finishes obtaining information from a personal consumer device 5 and processing it. Specifically, code may be embodied on memory 12 that directs processor 11 to display an icon on the touchscreen display of user interface 13. Such an icon may be the "Verify" icon shown on the display screen in FIG. 8. Additional code may be embodied on memory 12 that directs processor 11 to detect a user's selection of the icon and in response thereto send an activation signal to verification token 40. The activation signal may comprise an interrupt signal sent from processor 11 to processor 41 by way of input-output controller 16a, or a message sent by way of the USB line. Verification token 40 may have a first operating state where information from a portable consumer device 5 is not obtained or processed and a second operating state where information from a portable consumer device 5 is obtained and processed. The token's first operating state consumes less power from the battery than its second operating state. Processor 41 moves from its first operating state to its second operating state in response to receiving the activation signal, and moves from its second operating state back to its first operating state after obtaining and processing information from a portable consumer device 5 as described above, or after a selected period of time in case a device 5 is not presented to token 40. In one implementation, processor 41 operates at a first clock frequency in the first operating state, and a second clock frequency in the second operating state, where the first clock frequency is less than the second clock frequency. Processor 41 may also send I/O signals, such as through a gated clocking circuit, that cause power to token components 42, 43, and/or 46 (shown in FIG. 1) to be reduced or cut during the first operating state, and resumed during the second operating state. In another implementation, processor 41 enters a sleep mode during the first operating state, and periodically wakes up during a "wake-up mode" to determine if the aforementioned activation signal is present, or to poll processor 11 to determine if the "Verify" icon button has been activated by user 1. If not, processor 41 returns to the sleep mode; if so, processor 41 enters its second operating state. The wake-up mode of the first operating state and the second operating state may have the same clock frequency of operation. In sleep mode, the clock may be stopped for a selected duration of time. The clock may then be restarted after this duration to put processor 41 in the wake-up mode. This controlling of the clock may be implemented by disposing a programmable gate element between the output of a continuously-powered clock and processor 41, as previously described above.

Figure 12:
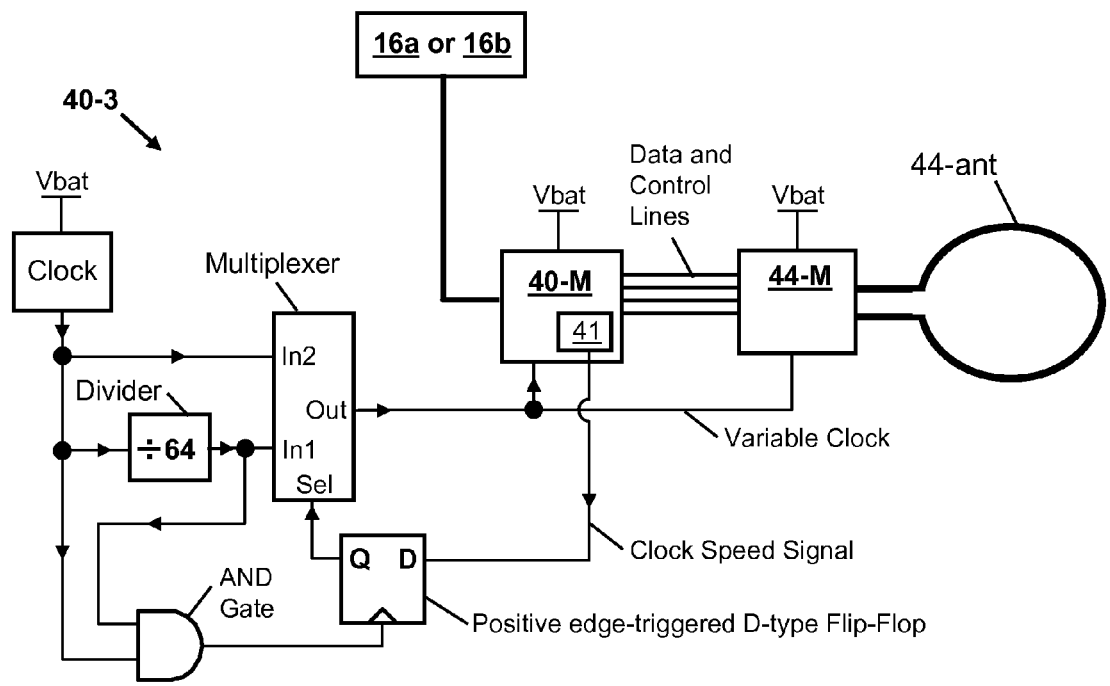

FIG. 12 shows an exemplary embodiment 40-3 of Token 40 that illustrates the above configuration and actions. Processor 41 (shown in FIG. 1) and the other components besides the card reader are grouped together in circuit box 40-M, and card reader 44 is divided into two components: antenna 44-ant and a main part 44-M of reader 44. CMOS digital circuitry is used for the components, and all components are continuously connected to the battery Vbat of device 10-7. A set of data and control lines is provided between circuit box 40-M and main part 44-M of the card reader. In this embodiment, components 40-M and 44-M (including processor 41) are operated at a slow clock rate during the first operating state, and a higher clock rate during the second operating state. The slow clock rate during the first operating state conserves energy while being sufficient enough to allow processor 41 to detect and process the activation signal from processor 11. A clocking circuit generates two clock signals, and provides circuitry that enables processor 41 (which is within component box 40-M) to select between the two clocks based on the logic state of a Clock Speed Signal that the processor outputs from one of its I/O ports to the clocking circuit. That signal and the clocking circuit are shown in FIG. 12. The main Clock is fed to a Divider, which generates a lower frequency clock, such as one that has 1/64 of the switching frequency of the main Clock. Both the slower clock and the main Clock are fed to respective inputs In1 and In2 of a 2-to-1 Multiplexer, which selects one of these two clock signals to provide to components 40-M and 44-M at its output Out based on a selection signal provided at an Sel input of the Multiplexer. The Clock Speed Signal from processor 41 is provided to the Sel input by way of a positive-edge triggered D-type Flip-Flop. The D input of the flip-flop is coupled to the Clock Speed Signal, and the Q output of the flip-flop is coupled to the Sel input of the Multiplexer. The flip-flop has a clock input ("^") to receive a clocking signal. In the D-type flip-flip, upon the occurrence of a rising edge of the clocking signal at the clock input ("^"), the logic state of the Q output changes to the logic state that is present at the D input slightly before the occurrence of the rising edge. The clock input ("^") of the flip-flop is fed by the output of an AND gate that has two inputs coupled to the two clocks respectively. This gating configuration ensures that a change in the logic state Clock Speed Signal is only fed to the Sel input of the multiplexer when both clocks are in their logic-high states. This ensures that any change in the clock frequency occurs during the same phase of the clock, thereby providing continuity of the clocking signal to components 40-M and 44-M.

Token 40-3 comprises the instruction sets described above for token 40, and further comprises a main routine that comprises the following further instructions: (1) a first instruction that directs data processor 41 to output a logic state for the Clock Speed Signal that selects the slower clock, and to monitor communications from the mobile phone's processor 11 for the activation signal; (2) a second instruction that directs data processor 41 to respond when the activation signal is received by outputting a logic state for the Clock Speed Signal that selects the faster clock, and further setting a timeout clock for a selected timeout period of time, such as for example 30 seconds, in case the user does not follow-up with a presentation of the device 5 to token 40-3; (3) a third instruction that directs data processor 41 to wait for card reader 44 to indicate that it has received identification information from device 5 within the timeout period and, if the indication has been received within the timeout period, to execute the previously-described instructions that obtain and process the identification information of device 5 to obtain a dCVV2 value; (4) a fourth instruction that directs the data processor to output a logic state for the Clock Speed Signal that selects the slower clock once the timeout period has expired. The third instruction may include an instruction that directs data processor 41 to reset the timeout period to a longer value, such as two minutes, once it receives the identification information of device 5; this will allow it more than sufficient time to obtain the dCVV2 value.

In another implementation, the activation signal is generated by processor 11 in response to processor 11 detecting that the user has navigated a web browser running on device 10-7 to a web page that is asking for information of a personal consumer device 5, such as a personal account number (PAN). The interaction between processor 11 and token 40 may be the same as is described above in the previous implementation, and token 40 may be implemented as described in the previous implementation, such as by Token 40-3. In this implementation, there is code embodied on memory 12 that directs processor 11 to present a web browser on the display screen, where the web browser handles one or more browser sessions. This code may comprise a web browser that has an application programming interface (API) that allows other processes run by processor 11 to access information about web browser sessions and/or the contents of web browser sessions. Such web browser codes are known and available in the art. Additional code is embodied on memory 12 that directs processor 11 to detect a browser session having a selected indication of a potential request for information from a portable consumer device 5, and to send an activation signal to the verification token when the selected indication is detected. The selected indication may comprise an indication on a web page that information from a portable consumer device is being requested. Such an indication may comprise the presence of one or more of the following: a form field requesting a personal account number (PAN), a form field requesting a CVV value, selected code text phrase in the contents of the page, a selected tag of a web page programming language (optionally with a selected parameter value). The selected indication may also comprise an indication that a browser session is being conducted with a cryptographic protocol, such as Transport Layer Security protocol or the Secure Sockets Layer protocol. The code that detects the selected indication may comprise code that directs data processor 11 to scan the contents of each newly-loaded web page for the selected indication.

As can be seen from the above description, token 40 may be integrated within the housing of device 10-7, where device 10-7 has a primary function that is different and separate from that of token 40. Token 40 may be attached to the housing of device 10-7, or may be attached to a motherboard or interconnect substrate disposed in the housing, or chassis disposed in the housing, and may be disposed in a manner such that its position relative to the housing is fixed and non-detachable. Moreover, token 40 may be disposed such that is behind an impenetrable surface of the housing of device 10-7. As a difference with many so-called electronic wallets, selected embodiments of token 40 do not permanently store the identification information that they read from the portable consumer devices. Typically, the information is not stored for more than 10 minutes, and is typically erased within 10 minutes or 24 hours, or is erased the next time token reads a portable consumer device. In any event, this action is incompatible with electronic wallets, which intend to store credit card data from a long time (several months) so that the wallet can take the place of the user's credit cards in the field.

Having described various embodiments and implementations of verification token 40, various embodiments and implementations of validation entity are now described. Validation entity 80 comprises a system having one or more servers coupled to a communications network that can receive a request from a verification token 40 to process (e.g., to validate) the identification information that the token has read from a portable consumer device 5, and to provide a device verification value (dCVV2) to the token and to payment processing network 70 if the identification information passes one or more validation tests. One of the servers of entity 80 is shown in FIG. 1; the server comprises one or more processors 81 electrically coupled to each of a tangible computer-readable medium 82, a user interface 83, one or more databases 86, and a networking facility 84, the latter of which is coupled to first and second communications networks 31 and 32. User interface 83 comprises one or more video output devices (e.g., displays, screens) and one or more input devices (e.g., keyboard, mouse, trackball, etc.), which enable an administrator of entity 80 to receive information from the server and to provide input to the server. Computer-readable medium 82 may comprise a combination of semiconductor memory and non-volatile storage, such as one or more disk drives and/or non-volatile memory.

Computer-readable medium 82 stores an operating system for the server, which enables processes and applications to be run by processor(s) 81, and enables codes for directing the operation of processor(s) 81 to be run. The operating system provides services to these processes and applications, and enables these processes and applications to access components of user interface 83, portions of computer-readable medium 82, networking facility 84, and other components of entity 80. The operating system may be full featured. Specifically, the operating system provides one or more I/O communications modules that enable processor(s) 81 to communicate with user interface 83 and databases 86. Each I/O communications module has an application programming interface (API) with a collection of functions that a processor 81 can call in order to access the components. The operating system of entity 80 also comprises one or more network services modules that can access networking facility 84 and set up communications sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 81 can call in order to manage communications with another entity. With these API facilities, a collection of API function calls can be readily constructed for a processor to execute that enables the processor to establish a communications channel with an entity on a communications network coupled to networking facility 84, and to exchange messages and data with the entity. The above operating system, modules, and APIs all include instructions that direct the operation of processor(s) 81.

One or more databases 86 may be configured as database servers, which processor(s) 81 can access via networking facility 84 over a private communications network 87, which is illustrated by the dashed line in FIG. 1. Validation entity 80 conventionally has a clock 88 for tracking time and dates for various applications. Clock 88 may be a simple counter of seconds, or fractions thereof, that can be read by processor 81 by an I/O operation, or may comprise a more complex arrangement of hardware or firmware that can provide the various components of the current date and time (year, month, day, hour, minute, and second) in various registers that can be read by processor 81 through the execution of one or more I/O operations.

Validation entity 80 can process identification information transmitted from a plurality of different verification tokens 40 (e.g., millions of tokens), and can process any number of transmissions by a particular token 40. Validation entity 80 applies one or more validation tests to verification token 40 and/or the identification information to obtain a level of confidence that the portable consumer device 5 was actually presented to verification token 40 to request the dCVV2 value. When the one or more validation tests are passed, and preferably when none of the tests are failed, validation entity 80 sends a dCVV2 value to verification token 40, and optionally to payment processing network 70 along with the account number present in the identification. For these tasks, validation entity 80 may comprise code embodied on computer-readable medium 82 that directs data processor 81 to communicate with computer 10 and verification token 40 using networking facility 84 over communications network 31. This code may include instructions that establish a communications session with computer 10, including the option of establishing an SSL session with mutual authentication and encryption based on a triple DES algorithm, and instructions for sending and receiving messages to verification token 40 through the communications session. Validation entity 80 may further comprise code embodied on computer-readable medium 82 that directs data processor 81 to receive encrypted identification information sent by verification token 40, and code that directs data processor 81 to decrypt the encrypted identification information. The identification information may be encrypted by a session key of an SSL session or by an encryption key stored in verification token 40 and known to validation entity 80, or may be doubly encrypted by both keys. The latter key may be uniquely assigned to the token. Validation entity 80 may further comprise code embodied on computer-readable medium 82 that directs data processor 81 to apply one or more validation tests as previously described above, and to send the dCVV2 value to token 40 and to optionally send the dCVV2 value and account number to payment processing network 70, if a selected number of validation tests are passed. Data processor 81 may access databases 86 in performing the one or more validation tests. The validation tests and codes therefore are described below in greater detail. These codes and codes described below for validation entity 80 may be implemented in any number of programming languages. Furthermore, one of ordinary skill in the art will be readily able to construct instructions to implement these codes in view of this disclosure without undue experimentation.

As described above, a first validation test that validation entity 80 may apply pertains to verifying that verification token 40 is authentic. For this, verification token 40 may send its serial number to validation entity 80, along with a test message encrypted by an encryption key, with the test message and encryption key (or corresponding decryption key) being known to token 40 and entity 80 (but not the general public), and with the encryption key further being uniquely assigned to the token's serial number. Validation entity 80 may access a database of token serial numbers and corresponding uniquely-assigned encryption keys (or corresponding decryption keys) in one of databases 86, and may determine whether verification token 40 has sent a correct test message for the serial number that the token provided. The test message may be fixed or variable; in the latter case it may be generated based on information known to both token 40 and entity 80. The test message may be encrypted and decrypted by a triple DES algorithm, which can be implemented by a number of well known sets of computer instructions using a single symmetric encryption key. The test message may also be encrypted by a first key of an asymmetric encryption key set at the verification token 40 and decrypted by the second key (the decryption key) of the asymmetric encryption key set at validation entity 80, which can be implemented by a number of well known sets of computer instructions. To validate the encrypted test message sent by token 40, entity 80 can decrypt the test message using the key that it has, and can compare the decrypted test message to a set of acceptable messages for a match. Entity 80 may also validate the encrypted test message in the reverse way by encrypting the set of acceptable messages and comparing the encrypted test message sent by token 40 to its set of encrypted acceptable messages. If the sent test message is correct, the first validation test can be deemed to have been passed, otherwise the first validation test is deems to have failed.

To implement the above validation test, validation entity 80 may comprise code embodied on computer-readable medium 82 that directs data processor 81 to receive one or more messages from verification token 40 via networking facility 84 that has the token's serial number and encrypted test message, code that directs data processor 81 to obtain from one of databases 86 a key that has been assigned to the received serial number of the token and one or more acceptable messages that can be accepted as the correct test message, and code that directs the data processor to validate the encrypted test message from the token using the encrypted test message, the obtained key, and the obtained one or more acceptable messages. The latter validation code may comprise code that directs data processor 81 to decrypt the encrypted test message using the obtained key, and code that directs data processor 81 to compare the decrypted test message to the one or more acceptable messages to determine if the first validation test has been passed (in the case of a match between the decrypted test message and an acceptable message), or has been failed (in the case of no such match). In addition, or as another approach, the above validation code may comprise code that directs data processor 81 to encrypt the obtained acceptable messages with the encryption key for token 40 (as found in the database according to the token's serial number), to compare the encrypted test message from token 40 to the one or more encrypted acceptable messages to determine if the first validation test has been passed (in the case of a match between the encrypted test message and an encrypted acceptable message), or has been failed (in the case of no such match). An acceptable message may be obtained by accessing it directly from one of databases 86, or by generating it from information stored in one or more of databases 86. As an option, if the first validation test is failed, validation entity 80 may record the serial number of the failed token 40 and the source IP address from which the failed token 40 made the request in one of databases 86. For this, validation entity 80 may further comprise code that directs data processor 81 to obtain the source IP address from the request message and to store the source IP address and the token's serial number as one record or two separate records in one of databases 86, which may be called the failed validation database 86. This information may be accessed as port of the second validation test described below. The above codes can be implemented with conventional I/O instructions, API function calls to databases, memory access instructions, CPU arithmetic and logic instructions, and CPU control instructions. In view of this disclosure, the codes may be implemented by one of ordinary skill in the art without undue experimentation.

As a second validation test, validation entity 80 may have a database in databases 86 that tracks the serial numbers of verification tokens that have been used in fraudulent activities (e.g., suspicious tokens), and validation entity 80 may check the serial number of verification token 40 against this database. If a check of this database indicates that verification token 40 has not been involved in fraudulent activity or is not otherwise suspicious, the second validation test can be deemed to have been passed. To assist in tracking fraudulent activity back to a verification token, validation entity 80 may send the serial number of token 40 along with the dCVV2 value and account number that it sends to payment processing network 70. If network 70 later finds out that the transaction processed with the account number provided by token 40 was fraudulent, it can send a message to that effect to validation entity 80, and entity 80 may then enter the serial number of the token into the database of tokens used in fraudulent activities. To implement the second validation test, validation entity 80 may comprise code embodied on computer-readable medium 82 that directs data processor 81 to receive a message from verification token 40 via networking facility 84 that has the token's serial number, code that directs data processor 81 to have the received serial number compared with serial numbers stored in a database of databases 86 that stores serial numbers of suspicious tokens used in fraudulent transactions to determine if the second validation test has been passed (no fraudulent activity), or has been failed (fraudulent activity). This code may further include instructions that direct processor 81 to obtain the source IP address of the message from token 40, and to compare the source IP address and the serial number of token 40 to IP addresses and serial numbers in the failed validation database 86 for a match. If a match is found, the second validation test may be deemed to have been failed. Checking the token serial numbers and IP addresses in this way prevents retry attacks by fraudsters. The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

As a third validation test, validation entity 80 may send a message to verification token 40 requesting that token 40 send it one or more pieces of computer-specific information about computer 10, such as the serial numbers of one or more of the following: the computer's processor, one or more of the computer's disk drives, the computer's operating system. Validation entity 80 may receive this information and check it against a database storing computer-specific information of suspicious computers known to have been involved in fraudulent activity. If a check of this database indicates that the computer 10 used by verification token 40 has not been involved in fraudulent activity, the third validation test can be deemed to have been passed. To assist in tracking fraudulent activity back to computer 10, validation entity 80 may send the serial number of token 40 and the computer-specific information along with the dCVV2 value and account number that it sends to payment processing network 70. If network 70 later finds out that the transaction processed with the account number provided by token 40 was fraudulent, it can send a message to that effect to validation entity 80, and entity 80 may then enter the serial number of the token into the database of suspicious tokens used in fraudulent activities, and the computer-specific information into the database of suspicious computers known to have been involved in fraudulent activity. To implement the third validation test, validation entity 80 may comprise code embodied on computer-readable medium 82 that directs data processor 81 to send a message to verification token 40 requesting computer-specific information (if verification token 40 has not sent such information beforehand without prompting), code that directs data processor 81 to receive one or more data messages from verification token 40 via networking facility 84 that have the token's serial number and the computer-specific information, and code that directs data processor 81 to have the received computer-specific information compared with computer-specific information stored in a database (of databases 86) that stores computer-specific information of suspicious computers used in fraudulent transactions to determine if the third validation test has been passed (no fraudulent activity), or has been failed (fraudulent activity). The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

By conducting one or more of the above three validation tests, validation entity 80 can obtain some degree of confidence that the identification information sent by token 40 is valid, and can, in some implementations, provide the dCCV2 value to token 40 and payment processing network 70. In this case, verification token 40 does not need to send the digital fingerprint or the variable datum of the portable consumer device 5 in the identification information, and does not need to obtain these datum from device 5.

To increase the degree of confidence, validation entity 80 may perform a fourth validation test that compares a digital fingerprint received in the identification information, if present, with the stored copy of the valid digital fingerprint that entity 80 has for the account number specified by the identification information. If the digital fingerprints match to an acceptable degree (e.g., the degree of similarity, or correlation, of the two fingerprints being above a selected level of similarity), validation entity 80 can deem the fourth validation test as being passed. The degree of similarity between the two fingerprints may be assessed by applying a correlation function to the two fingerprints. Such correlation functions are well known to the art. Before receiving identification information for a portable consumer device 5 from a token, the issuing bank for the device may provide validation entity 80 with the valid digital magnetic fingerprint of the device, which entity 80 may store in one of databases 86. When validation entity 80 receives identification information from a verification token 40 for a specific portable consumer device 5, it accesses databases 86 for its record of the valid digital fingerprint, and compares the received fingerprint against the valid digital fingerprint to assess a degree of similarity, and to determine if the fourth validation test has been passed (e.g., the degree of similarity between the two fingerprints is above a selected level), or has been failed (e.g., the degree of similarity between the two fingerprints is below the selected level). To implement the fourth validation test, validation entity 80 may comprise code embodied on computer-readable medium 82 that directs data processor 81 to obtain the stored valid digital fingerprint for the account from one of databases 86, and code that directs data processor 81 to compare the received digital fingerprint and the stored valid digital fingerprint for similarity to determine if the forth test is passed (sufficient similarity) or failed (not sufficient similarity). The latter code may comprise code that directs data processor 81 to generating a value representative of the similarity between the two fingerprints by applying one or more correlation functions to the fingerprints, and comparing the value against a selected level. Such correlation functions, also known as probabilistic models, are known to the credit card art. The above codes can be implemented with conventional I/O instructions, API function calls to databases, memory access instructions, CPU arithmetic instructions, CPU logic instructions, and CPU control instructions. In view of this disclosure, the codes may be implemented by one of ordinary skill in the art without undue experimentation.

To also increase the degree of confidence over that provided by the first three validation tests described above, validation entity 80 may perform a fifth validation test that compares a variable datum (e.g., CVC3, dCVV, cryptogram) received as part of the identification information, if present, with a set of one or more acceptable values for the variable datum that validation entity 80 has for the account number provided as part of the identification information. If the values match, validation entity 80 can deem the fifth validation test as being passed. There are number of ways that the variable datum can be configured to vary with time. As some examples, the variable datum can be configured to have its value vary with each use of portable consumer device 5, and device 5 can provide a counter value in the datum or along with the datum. Validation entity 80 or a payment processing network can use the counter value to determine what value the variable datum should have for the given counter value. This determination may be done based on an algorithm that is a function of the counter value (and/or other possible variables), or a look-up table whose entries are correlated to the counter value (the table may be cyclically repeated). The algorithm may comprise one or more random number generators, each of which accepts a starting "seed" value, whose value can be selected to customize the algorithm to a particular portable consumer device 5. The values of the look-up table may be based on the output of the algorithm. The variable datum may also be based on time, date, or other information known to both verification token 40 and entity 80, which may or may not use a counter value. Additional ways of generating the values of a variable datum are discussed in U.S. patent application Ser. No. 10/642,878 entitled "Method and System for Generating a Dynamic Verification Value" filed on Aug. 18, 2003, and in U.S. patent application Ser. No. 11/764,376 entitled "On-Line Payment Transactions" filed on Jan. 29, 2008. Both of these applications are incorporated herein by reference in their entirely for all purposes. In some implementations, there may be slight differences in the starting information that device 5 and entity 80 use in generating their respective datum values, such as differences in the times of their clocks, and entity 80 may generate a set of acceptable datum values based on possible slight differences in the starting information, and may compare the datum value received from device 5 with each member of the set to determine if a match exists.

A cryptogram, which typically has more characters than a CVC3 value or a dCVV value, may be generated by an algorithm in a similar way as described above, except that a piece of transaction information is usually included as an input to the algorithm. As previously described below, if token 40 seeks a cryptogram from a cryptogram-enabled device 5, it provides device 5 with dummy transaction information which is known to both token 40 and validation entity 80, but not known to the general public. When the variable datum received by entity 80 from token 40 comprises a cryptogram (which may be deduced from the character length of the variable datum or the account number of the device 5), validation 80 may look up the dummy transaction information in one of its databases 86 based upon the serial number of token 40. Validation entity 80 may determine the identity of the issuing bank 60 for the device 5 based on the device's account number, and may request the current value of the card's Application Transaction Counter (ATC) from the issuing bank 60. Entity 80 may then generate the cryptogram based on the dummy transaction information, the ATC, and other information used in the algorithm, and compare the generated cryptogram with the cryptogram received from token 40. If the cryptograms match, validation entity 80 can deem the fifth validation test as being passed. In some implementations, there may be slight differences in the ATC values that device 5 and entity 80 use in generating their respective cryptograms, and entity 80 may generate a set of acceptable cryptograms based on small incremental differences in the ATC value, and may compare the cryptogram received from device 5 with each member of the set to determine if a match exists. If a match cannot be found, the fifth validation test is deemed to have been failed. As another approach, validation entity 80 may forward a request for the cryptogram's value to the issuing bank 60 along with a copy of the dummy transaction information. Validation entity 80 may then compare the cryptogram received back from the issuing back to that received from token 40 to determine whether there is a match. As yet another approach, validation entity 80 may forward the dummy transaction information and the cryptogram received from token 40 to the issuing bank 60 with a request that the bank determine whether the cryptogram is valid or not, and to send its determination to validation entity 80. Validation entity 80 may then determine that the fifth validation test is passed if the bank sends an indication that the cryptogram received from token 40 is valid, and failed otherwise.

Before receiving identification information for a portable consumer device 5 from a token, the issuing bank for the device may provide validation entity 80 with the look-up table, algorithm (including any seed values), or other data elements that the device uses to generate the device's variable datum (e.g., CVC3, dCVV, or cryptogram), which entity 80 may store in one of its databases 86. When validation entity 80 receives identification information from a verification token 40 for a specific portable consumer device 5, it accesses its record of the look-up table, algorithm, or other data elements for the specific device 5 to determine its value or set of values for the device's variable datum, and compares the received value for a variable datum (e.g., CVC3, dCVV, or cryptogram) against its value or set of acceptable values for the variable datum to determine if the fifth validation test has been passed (e.g., a match in values is found), or has been failed (e.g., a match has not been found). To implement the fifth validation test, validation entity 80 may comprise code embodied on computer-readable medium 82 that directs data processor 81 to access the one or more stored data elements used to obtain the variable datum for the account from one of databases 86, code that directs data processor 81 to obtain one or more acceptable values for the variable datum from the one or more stored data elements, and code that directs data processor 81 to compare the received variable datum and the one or more acceptable values for a match to determine if the fifth test is passed (a match is found) or failed (a match is not found). The code that directs data processor 81 to obtain one or more acceptable values may be based upon the look-up table method described above, or any of the algorithm based methods described above. The codes may include instructions that direct data processor 81 to determine if a received variable datum comprises a cryptogram, and if so, to obtain the dummy transaction information from a database 86 based upon the serial number of the token. Depending upon the implementation for processing cryptograms, the code may further include instructions that direct data processor 81 to determine the identity of the issuing bank and to obtain an ATC value for the device 5 from the bank, and to generate one or more acceptable values of the cryptogram using the dummy transaction information, the ATC value, and other inputs used in the algorithm. Also, the code may further include instructions that direct data processor 81 to send the account information and the dummy transaction information to the identified issuing bank with a request for one or more acceptable cryptogram values. Also, instead of directing processor 81 to obtain one or more acceptable cryptogram values and to compare the cryptogram received from token 40 to the acceptable cryptogram values, the code may include instructions that direct data processor 81 to obtain the dummy transaction information as described above, to identify the issuing bank as described above, to send the account information, dummy transaction information, and the cryptogram received from token 40 to the identified bank with a request that the bank send back an indication of whether or not the cryptogram is valid, and to pass or fail the fifth validation test based on the indication sent back by the issuing bank. The above codes can be implemented with conventional I/O instructions, API function calls to databases, memory access instructions, CPU arithmetic instructions, CPU logic instructions, and CPU control instructions. In view of this disclosure, the codes may be implemented by one of ordinary skill in the art without undue experimentation.

Validation entity 80 may be configured to perform one or more of the above validation tests, and may be configured to send a dCCV2 value to verification token and payment processing network 70 if one or more of the tests are passes. Validation entity 80 may comprise code embodied on computer-readable medium 82 that directs data processor 81 to execute a selected one or more of the validation tests and track the pass/fail results, and code that directs data processor 81 to generate and send the dCVV2 value if a selected number of tests have been passed. Since the dCVV2 value is being sent to both the merchant (relayed through verification token 40) and the payment processing network 70 (which may forward it to the issuing bank), validation entity 80 may use any method to generate the dCCV2 value, and need not use the method used by portable consumer device 5 to generate the variable datum (e.g., the CVC3 or dCVV). Validation entity 80 may generate the dCVV2 values using a pseudo-random number generator or a look-up table, or a sequential counter (such as when distributing the values from that counter over different accounts). The dCVV2 generation process can be done on a per transaction basis (fully dynamic), or for a group of transactions (semi-dynamic), the latter being for a particular device 5 or a group of devices 5. If two or more devices 5 are assigned under a common account number, the identification information sent by token 40 may comprise a device identifier as well as an account number, and validation entity 80 may use the device identifier to distinguish between the devices and to generate different dCVV2 values for the devices that are under a common account number. Validation entity 80 may use a particular dCVV2 value for a particular device 5 over a selected time period (such as three days), and then select another dCVV2 value for the particular device for the next selected time period, and so on. Moreover, validation entity 80 may receive the dCVV2 values to use during the selected time periods from the issuing bank of the device 5 in advance of the selected time periods, and store them for later use, as determined by entity 80's clock. This permits validation entity 80 to omit the action of sending the dCVV2 values to payment processing network 70. The device verification value provided by validation entity 80 may have the same format as the CVC3s and dynamic CVVs ("dCVVs") output by existing smartcard credit cards (e.g., a string of 3 or 4 numbers). As another approach, validation entity 80 may send a message to the issuing bank 60 for portable consumer device 5 to request a value to provide as the dCVV2 value; this request may include the account number and any device identifier. The above codes and actions can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

As described above, validation entity 80 may send to token 40 the user's shipping address information and/or billing address information that has been previously associated to device 5. The association may be stored in a database 86 of validation entity 80 or at the issuing bank 60 for device 5. Validation entity 80 may further comprise code that directs data processor 81 to obtain address information for the consumer account indicated by the account number in the received identification information, either from a database 86 or from an issuing bank 60, and to send the address information to token 40 along with the device verification value if a selected number of validation tests have been passed, as described above. The above codes and actions can be implemented with conventional I/O instructions, database function calls, network function calls, memory access instructions, CPU arithmetic instructions, CPU logic instructions, and CPU control instructions. In view of this disclosure, the codes may be implemented by one of ordinary skill in the art without undue experimentation.

As indicated above, validation entity 80 may be configured to send a dynamic account number (dPAN) to verification token 40 and the payment processing network 70 along with the dCVV2 value. Validation entity 80 may contact the issuing bank 60 for device 5 to obtain the dPAN, or may read it from a list of dPANs previously sent to entity 80 by bank 60 or created by entity 80 or network 70, or may generate it from an algorithm previously provided to entity 80 by bank 60. Validation entity 80 may comprise code embodied on computer-readable medium 82 that directs data processor 81 to execute these actions, as desired by the issuing bank. When payment processing network received the dCCV2 value, dPAN value, and the account number for device 5, it may forward all three datum to the issuing bank 60 so that the issuing bank can correlate the dPAN to the account number of device 5. The above codes and actions can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

Verification entity 80 may further comprise code that directs processor 81 to send an alert text message to the personal communication device 7 of user 1 or send an alert e-mail message to an e-mail account of user 1 when one or more of the following events occurs: (1) when verification token 40 initiates communications with entity 80, (2) when verification token 40 reads a portable consumer device 5 of user 1, (3) when verification entity 80 receives identification information from a portable consumer device 5 or a verification token 40 associated with user 1, (4) when verification entity 80 validates said identification information, (5) when verification entity 80 sends a dCVV2 value to verification token 40, and (6) when verification entity 80 denies a request for a dCVV2 value. The alerts sent by entity 80 may include information related to the events that triggered the alerts, such as a portion of the account number involved. The alert text messages may be sent from networking facility 84 to an SMS relay server 35 that is coupled to one of communications networks 31 and 32, along with the phone number or network address of the user's communication device 7. The SMS relay server has an interface to one or more mobile communication networks, and can relay the text message to the phone number or network address provided by processor 81. Validation entity 80 may comprise the relay server. Email alerts may be sent directly to the user's e-mail account from networking facility 84. For this, networking facility 84 may comprise a conventional mail agent, which is well known to the art.

Validation entity 80 may comprise a website accessible to the user 1 that enables the user: (1) to create a password-protected management account associated with the serial number of the token, the latter of which may be provided on a slip of paper originally sent with the token; (2) to associate an e-mail address to be used for one or more of the above-described alerts; (3) to associate a mobile number and/or URID (e.g., network address) of the user's communications device 5 to be used for one or more of the above-described alerts; and (4) to select one or more of the above-described alert conditions The website may also enable the user to provide and associate the account numbers for one or more of the user's devices 5 with the password-protected account, and may further enable the user to associate the e-mails and mobile numbers for the alerts to particular devices 5 according to their account numbers. The website may also enable the user to associate a shipping address and/or billing address to one or more specific device account numbers, which validation entity 80 may provide to token 40 for each dCCV2 request made for such a specified device account number. This association may include an option that the user can select for a specified device account that directs entity 80 to obtain the address information from the issuing bank 60 for the specified device account. The website may also enable the user to associate a shipping address and/or billing address to the token itself, which validation entity 80 may provide to token 40 for each dCCV2 request in which a shipping address and/or billing address has not been associated to the device account number contained in the dCVV2 request.

One of databases 86 may be assigned to hold the above-described password-protected accounts of the users. When validation entity 80 receives a validation request from verification token 40, code in entity 80 can direct processor 81 to query this database 86 to find the user's password-protected account (e.g., identify the user from the token's serial number and/or the account number sent in the identification information), to determine what text message alerts and emails are to be generated and sent based on the parameters stored in the password-protected account, to identify the mobile phone number or universal resource identifier (e.g., network address) of the personal communication device to which to sent the messages, and/or to identify the email address to which to send the messages, and to send the determined messages to the identified destinations. One or more alerts pertaining to a particular dCVV2 request may be combined together into a single text message or email to the user. Entity 80 can also have code that directs data processor 81 to determine from the account record if any shipping address information or billing address information is to be sent with the dCVV2 fulfillment message by looking up the settings that the user may have provided for the device account number indicated in the dCVV2 request message, and to send the address information to token 40 according to the found settings. The above codes and actions can be implemented with HTML page codes, XML page codes, and the like (e.g., web pages), conventional I/O instructions, memory access instructions, database API function calls, CPU arithmetic instructions, CPU logic instructions, and CPU control instructions. In view of this disclosure, the codes may be implemented by one of ordinary skill in the art without undue experimentation.

In cases where validation entity 80 sends a dPAN to a verification token, it may send an e-mail alert and/or text alert to the user providing the user with a transaction number that has been associated with the dPAN. The transaction number can enable the user to more easily return goods purchased in the transaction. The transaction number is different from the dPAN and the account number, but enables the transaction conducted with the dPAN to be traced back to the merchant and the issuing bank. For this, entity 80 may comprise code that directs data processor 81 to access the user's management account based on the account number obtained from the identification information received from token 40 to obtain a mobile phone number or universal resource identifier (e.g., network address) of a personal communication device associated with the account number, or an email address associated with the account number, and to which the transaction number is to be sent. Entity 80 may further comprise code that directs data processor 81 to send the transaction number along with the dPAN, date, time, and dCVV2 value to the obtained phone number or universal resource identifier of the personal communication device, or the obtained email address. The code also directs data processor 81 to send this information to payment processing network 70 and/or issuing bank 60, along with the account number for correlation purposes. The code may also direct data processor 81 to send the transaction number to token 40, and token 40 may have code that directs its processor 41 to enter this information in a visible or hidden field of the merchant's checkout page. Token 40's code for this may be implemented in the same way as the code for entering the dCVV2 value. The above codes and actions can be implemented with database function calls, conventional I/O instructions, memory access instructions, database API function calls, CPU arithmetic instructions, CPU logic instructions, and CPU control instructions. In view of this disclosure, the codes may be implemented by one of ordinary skill in the art without undue experimentation.

Figure 4:
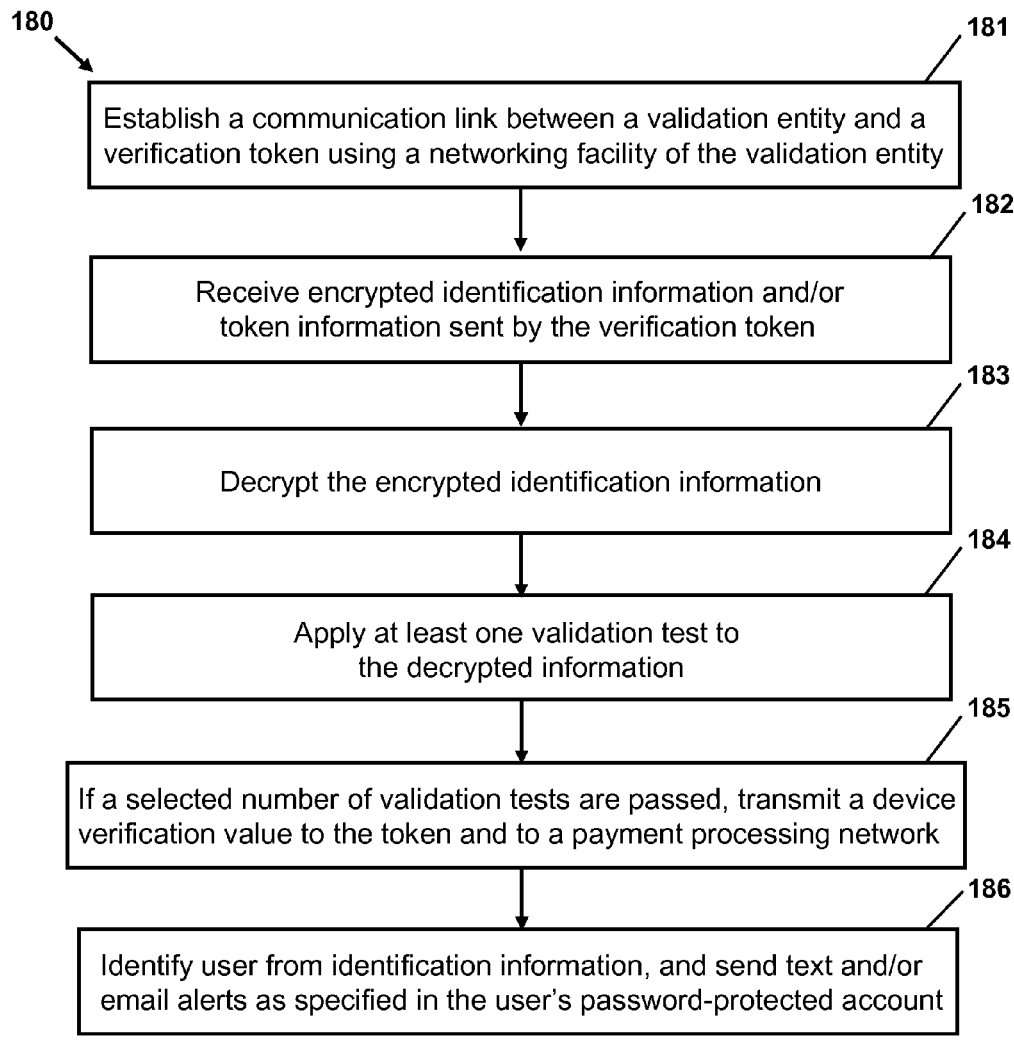
FIG. 4 illustrates an exemplary method embodiment that can be used by a validation entity.

FIG. 4 illustrates an exemplary embodiment 180 of a method that can be used by validation entity 80. Exemplary method 180 comprises a plurality of actions 181-186. Action 181 comprises establishing a communication link between validation entity 80 and a verification token 40 using a networking facility of validation entity 80. Action 182 comprises receiving encrypted identification information pertaining to device 5 and/or token information (e.g., serial number and encrypted message) sent by verification token 40. Action 183 comprises decrypting the encrypted information (e.g., encrypted identification information and/or encrypted message from the token). Action 184 comprises applying at least one validation test to the decrypted information. Action 185 comprises transmitting, if a selected number of validation tests are passed, a device verification value to verification token 40 and optionally to payment processing network 70. In some implementations, a dPAN may be transmitted as well, as described above. In some implementations, shipping address information and/or billing address information may be transmitted as well, as described above. Action 186 comprises identifying the user from the identification information, and sending text and/or email alerts to the user as specified in the user's password-protected account.

Yet further embodiments and implementations are described.

It may be appreciated that some implementations of verification token 40 may be configured to work with selected consumer payment devices 5, such as those issued by a selected bank, or configured to work with a selected merchant website 20.

In yet further implementations, verification token 40 may contain the URID of validation entity 80, which handles validation requests for several different co-branded portable consumer devices 5. In addition, each of these co-branded devices 5 may hold a URID to a co-branding merchant. The merchant URID is read by verification token 40 and provided to a validation entity along with the device's identification information. Validation entity 80 can send the validated identification information to the merchant URID.

Embodiments of the invention are not limited to authentication systems involving transactions. The same approach could be applied for other authentication systems. For example, embodiments could be used to authenticate a user using an online banking application. A cardholder may enter his user ID into a banking website. The cardholder can then present his or her portable consumer device to a verification token. The banking website can validate the User ID and the token credentials by communicating with a validation entity.

Embodiments of the invention are not limited to the above-described embodiments. For example, although separate functional blocks are shown for an issuer, payment processing system, and acquirer, some entities perform all of these functions and may be included in embodiments of invention.

In each of the embodiments described herein, the communications between computer 10 and validation entity 80 may be facilitated by, and/or conveyed through, a gateway (e.g., a proxy server, server entity, etc.) that is disposed between computer 10 and validation entity 80. Such a gateway is shown at 90 in FIG. 13. Gateway 90 may act as an intermediary between a plurality of verification tokens 40-A, 40-B, . . . and their associated computers 10-A, 10-B, . . . on the one side, and a plurality of validation entities 80-A, 80-B, . . . on the other side. Tokens 40-A, 40-B, . . . may be constructed and configured the same as token 40 shown in FIG. 1, and may interact with respective computers 10-A, 10B, . . . , respective users 1-A, 1-B, . . . , and respective portable consumer devices 5-A, 5-B, . . . Computers 10-A, 10B, . . . may be the same as computer 10 shown in FIG. 1, and may be coupled to the first communications networks 31, as described above. First communications network 31, second communications network 32, merchant websites 20, acquiring banks 50, issuing banks 60, and payment processing network 70 are coupled to one another as described above. First and second communications networks 31, 32 are also coupled to a plurality of validation entities 80-A, 80-B, 80-C, . . . , each of which may be constructed and configured the same as validation entity 80 shown in FIG. 1.

In the below discussion of the embodiments and implementations shown in FIG. 13, a reference number without a suffix -A, -B, or -C generically refers to each of the suffixed items (e.g., entity 80 refers to each of 80-A, 80-B, 80-C).

Gateway 90 may receive one or more initial communications from one of verification tokens 40-A, 40-B, . . . (via one of computer 10-A, 10B, . . . in communication with the token), and may determine from information in the initial communication(s) an appropriate one of a plurality of validation entities 80-A, 80-B, 80-C, . . . to use to fulfill the token's request for a dCVV2 value. For example, each verification token 40-A, 40-B, . . . may be configured to operate with portable consumer devices 5 issued by many different issuing banks 60 or other such entities, and one or more of the validation entities 80 may be configured to process requests from portable consumer devices 5 issued by respective issuing banks 60 or other such entities. Gateway 90 may determine an appropriate one of validation entities 80-A, 80-B, 80-C, . . . based upon the identification information that the token read from a portable consumer device and sent to the gateway in an initial communication. For example, a portion of the account number in the identification information may comprise an unique identifier assigned to the bank 60 that issued the portable consumer devices 5 from which the identification information was read.

In one implementation, after gateway 90 has determined an appropriate validation entity for the token's request, the gateway may redirect the token to conduct further communications with the determined appropriate validation entity, or may direct the determined validation entity to contact the token to conduct further communications. In another implementation, all communications between the verification token and the determined appropriate validation entity may be conveyed through gateway 90 (after the gateway has initially determined the identity of the appropriate validation entity based upon one or more initial communications with the token). This latter implementation may comprise relatively simple passing through of communications between the token and the appropriate validation entity with minimal processing by gateway 90, or may comprise having the gateway virtually presenting itself as the appropriate validation entity to the verification token. Such virtual presentation may involve gateway 90 decrypting each message from the verification token, communicating with the appropriate validation entity to formulate a response to the token's message, and encrypting and sending a response message to the verification token. In each of the above implementations, and in other implementations, gateway 90 may also conduct one or more validation tests on behalf of the appropriate validation entity, particularly those related to validating the verification token. In this case, the gateway does not need to send to the determined appropriate validation entity those communications it receives from the token that pertain to validation tests that the gateway is handling. Gateway 90 may be associated with, or operated by, payment processing network 70 or the owner thereof. It may be appreciated that, in each of these implementations, Gateway 90 acts as an entity that can provide a device verification value (dCVV2 value) to token 40, just as in the case that validation entity 80 can provide a device verification value to token 40 when entity 80 is directly contacted by token 40.

Figure 13:
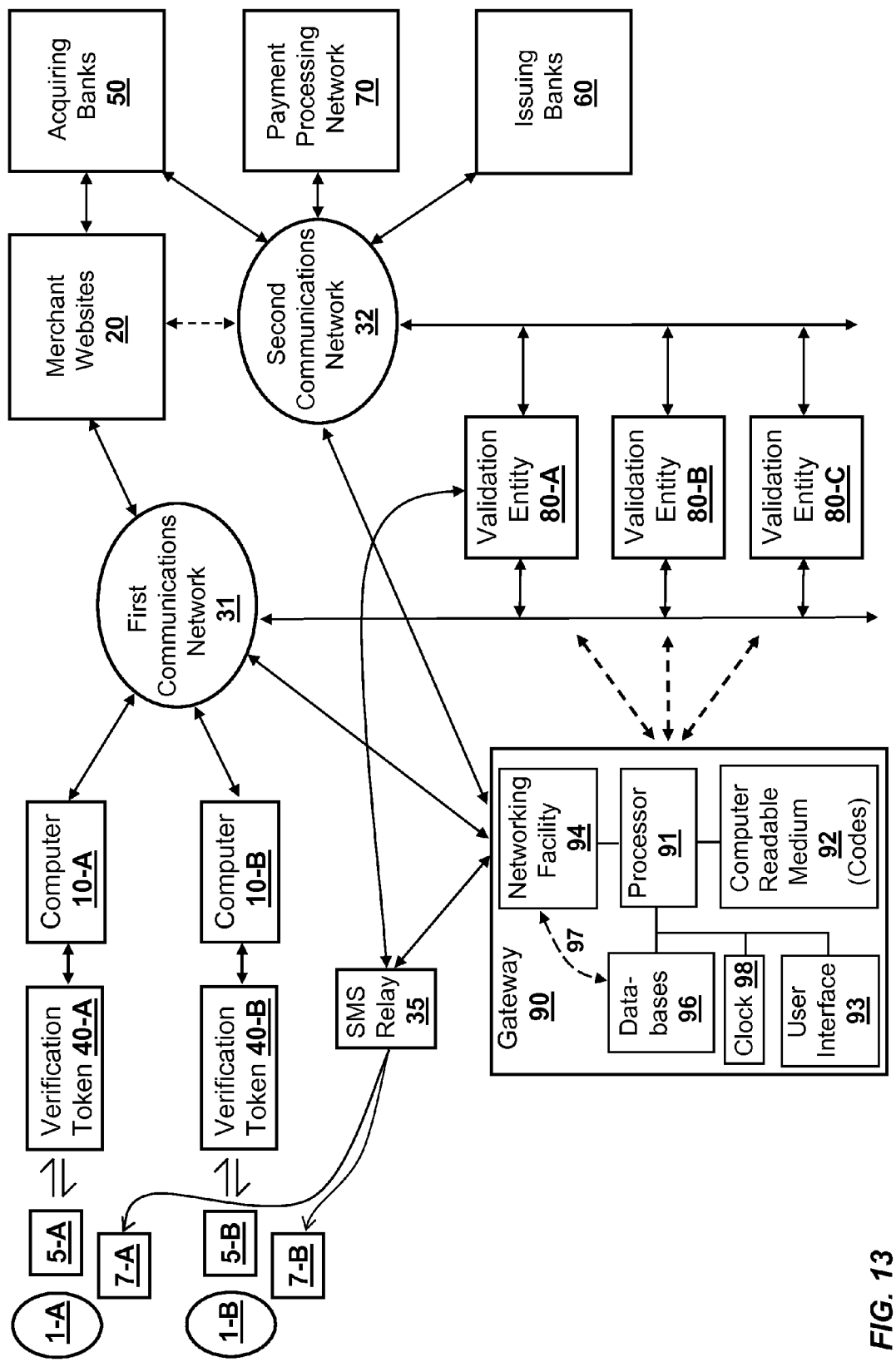
FIG. 13 illustrates additional exemplary embodiments of the invention.

Referring to FIG. 13, gateway 90 comprises a system having one or more servers coupled to a communications network that can receive a request from a verification token 40 to process, as described above. One of the servers of gateway 90 is shown in FIG. 13; the server comprises one or more processors 91 electrically coupled to each of a tangible computer-readable medium 92, a user interface 93, one or more databases 96, and a networking facility 94, the latter of which is coupled to first and second communications networks 31 and 32. User interface 93 comprises one or more video output devices (e.g., displays, screens) and one or more input devices (e.g., keyboard, mouse, trackball, etc.), which enable an administrator of gateway 90 to receive information from the server and to provide input to the server. Computer-readable medium 92 may comprise a combination of semiconductor memory and non-volatile storage, such as one or more disk drives and/or non-volatile memory.

Computer-readable medium 92 stores an operating system for the server, which enables processes and applications to be run by processor(s) 91, and enables codes for directing the operation of processor(s) 91 to be run. The operating system provides services to these processes and applications, and enables these processes and applications to access components of user interface 93, portions of computer-readable medium 92, networking facility 94, and other components of entity 90. The operating system may be full featured. Specifically, the operating system provides one or more I/O communications modules that enable processor(s) 91 to communicate with user interface 93 and databases 96. Each I/O communications module has an application programming interface (API) with a collection of functions that a processor 91 can call in order to access the components. The operating system of entity 90 also comprises one or more network services modules that can access networking facility 94 and set up communications sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 91 can call in order to manage communications with another entity. With these API facilities, a collection of API function calls can be readily constructed for a processor to execute that enables the processor to establish a communications channel with an entity on a communications network coupled to networking facility 94, and to exchange messages and data with the entity. The above operating system, modules, and APIs all include instructions that direct the operation of processor(s) 91.

One or more databases 96 may be configured as database servers, which processor(s) 91 can access via networking facility 94 over a private communications network 97, which is illustrated by the dashed line in FIG. 13. Gateway 90 conventionally has a clock 98 for tracking time and dates for various applications. Clock 98 may be a simple counter of seconds, or fractions thereof, that can be read by processor 91 by an I/O operation, or may comprise a more complex arrangement of hardware or firmware that can provide the various components of the current date and time (year, month, day, hour, minute, and second) in various registers that can be read by processor 91 through the execution of one or more I/O operations.

Gateway 90 may comprise code embodied on computer-readable medium 92 that directs data processor 91 to communicate with a computer 10 and an associated verification token 40 using networking facility 94 over communications network 31. This code may include instructions that establish a communications session with computer 10, including the option of establishing an SSL session with mutual authentication and encryption based on a triple DES algorithm, and instructions for sending and receiving messages to verification token 40 through the communications session. Gateway 90 may further comprise code embodied on computer-readable medium 92 that directs data processor 91 to receive encrypted identification information sent by verification token 40, and code that directs data processor 91 to decrypt the encrypted identification information. The identification information may be encrypted by a session key of an SSL session or by an encryption key stored in verification token 40 and known to gateway 90, or may be doubly encrypted by both keys. The latter key may be uniquely assigned to the token, as described above. Gateway 90 may further comprise code embodied on computer-readable medium 92 that directs data processor 91 to determine, from the received identification information and/or the token's identity (e.g., the token's serial number), the appropriate one of the validation entities 80-A, 80-B, 80-C, . . . to be used for further processing of the request from verification token 40. For this, data processor 91 may access one of databases 96 for a correlation list that relates identification information (or portions thereof) to validation entities 80, and/or for a correlation list that relates token identifiers to validation entities 80, and may then compare the information received from the token 40 with the correlation list(s) to determine the appropriate one of the validation entities 80. Gateway 90 may further comprise code embodied on computer-readable medium 92 that directs data processor 91 to apply one or more validation tests as previously described above, and to continue processing the request from token 40 if a selected number of validation tests are passed. Various ways of continuing the processing are described below in various possible implementations of gateway 90. The above codes for gateway 90, and codes for gateway 90 described below, may be implemented in any number of programming languages. Furthermore, one of ordinary skill in the art will be readily able to construct instructions to implement these codes in view of this disclosure without undue experimentation.

In one implementation, gateway 90 may further comprise code embodied on computer-readable medium 92 that directs data processor 91 to send a communication to token 40 (by way of its associated computer 10) informing the token to contact the determined appropriate validation entity 80 to obtain a dCVV2 value. This communication may include a URID for the determined appropriate validation entity. Token 40 may then communicate with the determined appropriate entity 80 as described above, and no changes to entity 80 are needed. In this implementation of gateway 90, the code may further direct data processor 91 to send a communication to the determined appropriate validation entity 80 that informs the entity of the request from the token 40 (along with an indication of the identification information sent by token 40), and informs the entity that the token 40 will be contacting it for a dCVV2 value for the identification information (as sent to gateway 90 by the token 40). This communication by gateway 90 can serve as an additional security measure that assures the appropriate validation entity 80 that the subsequent contact by token 40 is legitimate.

In another implementation, gateway 90 may further comprise code embodied on computer-readable medium 92 that directs data processor 91 to send a communication to the determined appropriate validation entity 80 with an indication of the identification information received from the verification token 40, and with a request for the validation entity to generate a dCVV2 value for the identification information and to send the dCVV2 value to the verification token 40 (by way of its associated computer 10). This communication may include a URID for the verification token 40. The codes of the validation entity 80 previously described above may be augmented to direct the entity's processor 81 to receive above-described communication from gateway 90, and to initiate communications with the requesting token 40. The codes of validation entity 80 need not need to direct the entity's processor 81 to receive the identification information from the requesting token (as that may have been provided to the entity by gateway 90); however, as an added security measure, the requesting token 40 may provide the identification information to entity 80, and the entity may include the code to receive the identification information from the token. In this implementation of gateway 90, the code for gateway 90 may further direct data processor 91 to send a communication to the verification token 40 (via the associate computer 10) informing the token that the determined appropriate validation entity 80 will be communication with it to potentially send a dCVV2 value.

In yet another implementation of gateway 90, the gateway may further comprise code embodied on computer-readable medium 92 that directs data processor 91 to: (1) send the initial communication from the requesting token 40 and/or an indication of the identification information sent by the requesting token 40 to the determined appropriate validation entity 80 to obtain a dCVV2 value; (2) to receive back a dCVV2 value from the appropriate validation entity 80; and (3) to send the dCV2 value to the verification token 40. This implementation of gateway 90 enables a validation entity 80 to omit the code for establishing communications with the computer 10 used by the requesting verification token 40 (that task may be handled by gateway 90). Those codes of entity 80 described above that direct communications with token 40 may be modified to direct the communications to gateway 90 instead. This implementation of gateway 90 enables the requests from many tokens 40 to be grouped together for more efficient handling by entity 80. In addition, since gateway 90 is virtually presenting itself to the verification token 40 as a validation entity, gateway 90 can serve as an Internet firewall and protect the validation entities 80-A. 80-B., . . . from malicious Internet attacks.

In yet another implementation, gateway 90 handles the initial communications with token 40 to determine the appropriate validation entity 80, and then hands over the communication channel to the determined validation entity 80 to complete the fulfillment of the token's request. All communications between the requesting token 40 and the determined entity 80 may be conveyed through gateway 90. If gateway 90 has previously established an SSL session with the requesting token 40, gateway 90 may send the session key(s) and protocols to the determined entity 80 so that the entity can take over the session (e.g., take over encrypting the communications to the token with the session keys and protocols). For this implementation, gateway 90 may further comprise code embodied on computer-readable medium 92 that directs data processor 91 to (1) send a communication to the determined appropriate validation entity 80 with an indication that it is to handle further communications with the requesting token (as routed through gateway 90) and, optionally, session information (which may include SSL session keys and protocols), (2) to forward further communications that gateway 90 receives from the requesting token 40 to the determined entity 80, and (3) to forward communications that gateway 90 receives from the determined entity 80 to the requesting token 40. For this, gateway 90 may maintain a table in memory or one of its databases 96 that tracks channels that are currently being passed through gateway 90, with each record in the table having the identity of the requesting token, the determined validation entity, and session information. To carry out the above second action, the code may direct processor 91 to access the channel table to locate the determined entity 80 for the requesting token 40, an to then forward the communication packets from the requesting token to the entity that was located in the table. Gateway 90 may encapsulate these forwarded communication packets to preserve their header information, and may include an indication of the identity of the requesting token 40 for the benefit of the determined entity 80. To facilitate the above third action, the determined validation entity 80 may send its communication packets for the requesting token 40 to gateway 90 in encapsulated form, optionally along with an identifier that identifies the requesting token in the capsule. Gateway 90 can then include code that directs its data processor 91 to extract, from the encapsulated packet, the token identifier and the packet that is to be sent to the requesting token 40. If the extracted packet already has the destination address for the computer 10 coupled to the requesting token 40, then the encapsulated packet does not need to include the identity of the requesting token. If the extracted packet does not include the destination address, the code of gateway 90 may direct data processor 91 to determine the destination address from the extracted token identifier and the above-described table of channel information, and to insert the determined destination address into the extracted packet before sending it to computer 10. This action can provide an additional layer of security. In addition, since gateway 90 is virtually presenting itself to the verification token 40 as a validation entity, gateway 90 can serve as an Internet firewall and protect the validation entities 80-A. 80-B., . . . from malicious Internet attacks.

The above implementation of gateway 90 enables a validation entity 80 to omit the code for establishing communications with the computer 10 used by the requesting verification token 40 (that task is handled by gateway 90), and to include code that directs processor 81 to receive the indication from gateway 90 that it is to handle further communications with the requesting token 40 (as routed through gateway 90) and, optionally, to receive the session information for the further communications (which may include SSL session keys and protocols). Those codes of entity 80 described above that direct communications with token 40 may be modified to direct the communications through gateway 90. For this, validation entity 80 may further comprise code embodied on computer-readable medium 82 that directs data processor 81 to create and maintain a table in memory or one of its databases 86 that tracks channels that are have been handed over from gateway 90; each record in the table may have the identity of the requesting token, the identification information of gateway 90, and the session information. The communication codes of entity 80 may be modified to receive encapsulated communication packets from gateway 90, to extract from these packets the communication packets from token 40, and to consult the above table to find the identity of token 40 and session information if such cannot be determined from source address of the extracted communication packets or any token identity sent by gateway 90 in the capsulated packets. The communication codes of entity 80 may also be modified to encapsulate the communication packets for token 40 in packets to be sent to gateway 90, optionally along with an identifier that identifies the requesting token in the capsule, and to send the encapsulated communication packets to gateway 90.

From the above description, it may be appreciated that validation entities 80 and gateway 90 are separate entities from computers 10, and are separate entities from verification tokens 40. It may also be appreciated that in several embodiments and implementations thereof that computers 10, validation entities 80, and gateway 90 are addressed as separate network nodes on communications network 31 (e.g., have different network addresses in the communication packets), and that tokens 40 communicate through the network nodes of computers 10 to entities 80 and/or gateway 90 (e.g., computers 10 construct and decode network communication packets for tokens 40). It may be also appreciated that, in several embodiments and implementations of token 40, token 40 may unconditionally send the read identification information to validation entity 80 and/or gateway 90 without requiring a validation between the token and the user, such as may be provided by the entry of a PIN or the provision of a biometric sample (e.g., fingerprint); and that token 40 may send the read identification information in a relatively short amount of time (such as within one minute of being read, and typically within ten seconds).

It may be appreciated that Embodiments of the invention enable a user to obtain a dynamic device verification value for a portable consumer device 5, such as a credit card, which the user can provide to a merchant site as payment data for completing a purchase transaction. The dynamic device verification value reduces the potential for fraud by third parties that may fraudulently obtain the account number of the portable consumer device (e.g., through skimming). In addition, the interaction of the portable consumer device with the verification token 40 enables the token to effectively inform the validation entity 80 that the portable consumer device 5 was physically in the presence of the token at the time the request for the device verification value was made, thereby providing a "card present" status for online purchases made with the portable consumer device. Embodiments of the invention also have utility in providing device verification values to the user in a highly secure manner, thereby enhancing security and reducing fraudulent use of credit cards. Moreover, embodiments of the present invention provide these services and benefits to the user with a very high "ease of use" factor.

It should be understood that various embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application, may be implemented as software code to be executed by a processor using any suitable computer language such as, for example, C, C++, C#, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the invention and embodiments thereof will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A verification token comprising:
    a peripheral interface adapted to communicatively couple to a peripheral interface of a mobile communications device;
    a reader adapted to read identification information from portable consumer devices;
    a computer-readable medium;
    a data processor electrically coupled to the peripheral interface of the verification token, the reader, and the computer-readable medium;
    code embodied on the computer-readable medium that directs the data processor to receive identification information read from a portable consumer device by the reader;
    code embodied on the computer-readable medium that directs the data processor to communicate with the mobile communications device by way of the peripheral interface;
    code embodied on the computer-readable medium that directs the data processor to transmit at least a portion of the received identification information to an entity; and
    code embodied on the computer-readable medium that directs the data processor to receive, after transmitting said identification information, a device verification value from the entity; and
    wherein the verification token is configured to be located within a housing of the mobile communications device; and further comprising
    code embodied on the computer-readable medium that directs the data processor to locate a browser web page on the mobile communications device that has a form field for the verification value, and to enter the verification value received from the entity in the form field.

2. The verification token of claim 1, wherein the peripheral interface of the verification token comprises a universal serial bus connection.

3. The verification token of claim 1, wherein the identification information is encrypted and includes an account number of the portable consumer device and at least one of the following: a digital fingerprint of a magnetic stripe of the portable consumer device, or a variable datum that varies each time the portable consumer device is read for its identification information.

4. The verification token of claim 1, wherein the code that directs the data processor to communicate with the mobile communications device comprises code that directs the data processor to send a device driver to the mobile communications device and an instruction to install the device driver in the operating system of the mobile communications device, wherein the device driver enables the mobile communications device to recognize the verification token and communicate with the verification token.

5. The verification token of claim 1 further comprising a serial number and an encryption key, and wherein the verification token is configured to transmit the serial number and a message encrypted by the encryption key to the entity, the serial number and the encryption key being uniquely assigned to the verification token.

6. The verification token of claim 1,
    the form field is a hidden field for the verification value, and the data processor enters the verification value received from the entity into the hidden field.

7. The verification token of claim 1, further comprising:
    code embodied on the computer-readable medium that directs the data processor to display the verification value received from the entity to the user on a display of the mobile communications device.

8. The verification token of claim 1, wherein the code that directs the data processor to receive the verification value from the entity further directs the data processor to receive a dynamic account number from the entity.

9. The verification token of claim 8,
    wherein the browser web page has an additional form field for the dynamic account number and the data processor automatically enters the dynamic account number in the additional form field.

10. The verification token of claim 8, further comprising:
    code embodied on the computer-readable medium that directs the data processor to display the dynamic account number and received from the entity to the user on a display device of the mobile communications device.

11. The verification token of claim 1, further comprising the code that directs the data processor to obtain address information; and
    code embodied on the computer-readable medium that directs the data processor to fill fields in the web page with respective portions of the obtained address information.

12. The verification token of claim 1, further comprising:
    code embodied on the computer-readable medium that directs the data processor to prompt a user to enter a password on a keyboard of the mobile communications device, to read a password entered by the user, and to compare the entered password against a stored password embodied on the computer-readable medium; and
    code embodied on the computer-readable medium that directs the data processor to prevent identification information from at least being read or sent when the read password is not the same as the stored password.

13. The verification token of claim 1, further comprising:
    code embodied on the computer-readable medium that directs the data processor to establish, a communications session with the entity; and
    code embodied on the computer-readable medium that directs the data processor to transmit the at least a portion of the received identification information using the established communications session.

14. The verification token of claim 13, wherein the code that directs the data processor to establish a communications session with the entity comprises one or more function calls to an application program interface of a network services module of the mobile communications device, the one or more function calls providing a universal resource identifier of an entity and an instruction to establish a communications session with the entity, the universal resource identifier being stored in the computer-readable medium or read from the portable consumer device.

15. The verification token of claim 14, wherein the communications session is established before the data processor reads device data from the reader.

16. The verification token of claim 14, further comprising code that directs the data processor to select one of a number of universal resource identifiers stored in the token based on a bank number provided in the read identification information or embedded in the account number of the read identification information.

17. The verification token of claim 1, further comprising code that directs the processor to encrypt at least a portion of the identification information prior to transmitting it to the entity.

18. The verification token of claim 1, wherein the verification value is a second verification value, and
wherein the received identification information read by the reader includes an account number and a first verification value provided by the portable consumer device;
wherein the at least a portion of the received identification information transmitted from the verification token to the entity comprises the account number and the first verification value;
wherein the second verification value received by the verification token from the entity is different from the first verification value.

19. The method of claim 1 wherein the reader is an RF ID reader.

20. The method of claim 19 wherein the entity is a payment processing network, which is in communication with an issuer of the portable consumer device.

21. A mobile communication device comprising:
a housing;
a first processor disposed within the housing;
a first memory unit disposed within the housing;
an input-output controller coupled to the first processor;
a verification token disposed within the housing and communicatively coupled to the input-output controller, the verification token comprising a second processor separate from the first processor, a second memory unit separate from the first memory unit, and a reader coupled to the second processor, the reader configured to obtain information from a portable consumer device, the verification token receiving identification information from the portable consumer device by way of the reader, transmit at least a portion of the received identification information to an entity that can provide a verification value by way of the first processor, and receive a verification value from the entity by way of the first processor; and
a battery that supplies power to the verification token.

22. The device of claim 21, wherein the battery also supplies power to at least one of the first processor, the first memory, and the input-output controller.

23. The device of claim 21, wherein the reader has a first operating state to detect the presence of the portable consumer device within a selected distance of the reader, and a second operating state to obtain information from the portable consumer device, wherein the reader moves from its first operating state to its second operating state when the presence of the portable consumer device is detected, and wherein the second operating state of the reader consumes more power from the battery than the first operating state of the reader.

24. The device of claim 23, wherein the second processor has a first operating state where information from the portable consumer device is not processed, and a second operating state where information from the portable consumer device is processed, wherein the second processor moves from its first operating state to its second operating state in response to information being obtained from the portable consumer device by the reader, and wherein the second operating state of the second processor consumes more power from the battery than the first operating state of the second processor.

25. The device of claim 24, wherein the second processor is coupled to the battery during the first and second operating states, wherein the device further comprises clocking circuitry that drives the second processor with a first clock signal during the first operating state and with a second clock signal during the second operating state, and wherein the second clock signal has a higher clocking frequency than the first clock signal.

26. The device of claim 24, wherein the second processor is coupled to the battery during the first and second operating states, wherein the device further comprises clocking circuitry that drives the second processor with a clock signal during the second operating state and withholds the clock signal to the second processor during the first operating state.

27. The device of claim 23, wherein the second processor has a first operating state where information from a portable consumer device is not processed, and a second operating state where information from a portable consumer device is processed, wherein the second processor moves from its first operating state to its second operating state when the presence of a portable consumer device is detected, and wherein the second operating state of the second processor consumes more power from the battery than the first operating state of the second processor.

28. The device of claim 27, wherein the second processor is coupled to the battery during the first and second operating states, wherein the device further comprises clocking circuitry that drives the second processor with a first clock signal during the first operating state and with a second clock signal during the second operating state, and wherein the second clock signal has a higher clocking frequency than the first clock signal.

29. The device of claim 27, wherein the second processor is coupled to the battery during the first and second operating states, wherein the device further comprises clocking circuitry that drives the second processor with a clock signal during the second operating state and withholds the clock signal to the second processor during the first operating state.

30. The device of claim 21, further comprising:
a display screen;
code embodied on the first memory that directs the first data processor to present a web browser on the display screen, the web browser handling one or more browser sessions;
code embodied on the first memory that directs the first data processor to detect a browser session having a selected indication and to send an activation signal to the verification token when the selected indication is detected;
wherein the verification token has a first operating state where information from the portable consumer device is not obtained, and a second operating state where information from the portable consumer device is obtained and processed, and wherein the verification token enters its second operating state in response to receiving the activation signal,
wherein the second operating state of the verification token consumes more power from the battery than the first operating state of the verification token.

31. The device of claim 30, wherein the selected indication comprises an indication that information from the portable consumer device is being requested.

32. The device of claim 30, wherein the selected indication comprises a web page having a field to accept a personal account number of the portable consumer device.

33. The device of claim 30, wherein the selected indication comprises a browser session being conducted with a cryptographic protocol.

34. The device of claim 33, wherein the cryptographic protocol comprises at least one of the Transport Layer Security protocol or the Secure Sockets Layer protocol.

35. The device of claim 30, wherein the selected indication comprises a selected tag of a web page programming language.

36. The device of claim 21, further comprising:
a display screen;
code embodied on the first memory that directs the first data processor to display a first icon on the display screen;
code embodied on the first memory that directs the first data processor to detect a user's selection of the first icon and in response there to send an activation signal to the verification token; and
wherein the verification token has a first operating state where information from a portable consumer device is not obtained, and a second operating state where information from a portable consumer device is obtained and processed, wherein the verification token enters its second operating state in response to receiving the activation signal, and wherein the second operating state of the verification token consumes more power from the battery than the first operating state of the verification token.

37. A mobile communication device comprising:
a housing;
a first processor disposed within the housing;
a first memory unit disposed within the housing;
an input-output controller coupled to the first processor;
a card reader configured to obtain information from a portable consumer device;
a second processor disposed within the housing and communicatively coupled to the input-output controller and the card reader, the second processor being separate from the first processor and configured to process information from portable consumer devices;
a battery that supplies power to the first and second processors, the first memory unit, and the card reader.

38. The device of claim 37, wherein the second processor has a first operating state where information from a portable consumer device is not processed, and a second operating state where information from a portable consumer device is processed, wherein the second processor moves from its first operating state to its second operating state when the presence of a portable consumer device is detected, and wherein the second operating state of the second processor consumes more power from the battery than the first operating state of the second processor.

39. The device of claim 38, wherein the second processor is coupled to the battery during the first and second operating states, wherein the device further comprises clocking circuitry that drives the second processor with a first clock signal during the first operating state and with a second clock signal during the second operating state, and wherein the second clock signal has a higher clocking frequency than the first clock signal.

40. The device of claim 38, wherein the second processor is coupled to the battery during the first and second operating states, wherein the device further comprises clocking circuitry that drives the second processor with a clock signal during the second operating state and withholds the clock signal to the second processor during the first operating state.

* * * * *